(12) United States Patent
Lau et al.

(10) Patent No.: US 11,388,044 B1
(45) Date of Patent: Jul. 12, 2022

(54) INDEPENDENT SITUATIONAL AWARENESS FOR A NETWORK

(71) Applicant: Peraton Labs Inc., Basking Ridge, NJ (US)

(72) Inventors: Chi Leung Lau, Red Bank, NJ (US);
David Shur, Basking Ridge, NJ (US);
Qiong Shen, Red Bank, NJ (US);
Kiran Rege, Basking Ridge, NJ (US);
Rajesh Krishnan, Red Bank, NJ (US);
Ta Chen, Basking Ridge, NJ (US);
Andrzej Cichocki, Red Bank, NJ (US);
Tom Banwell, Basking Ridge, NJ (US)

(73) Assignee: Peraton Labs Inc., Basking Ridge, NJ (US)

( * ) Notice: Subject to any disclaimer, the term of this patent is extended or adjusted under 35 U.S.C. 154(b) by 0 days.

(21) Appl. No.: 17/002,361

(22) Filed: Aug. 25, 2020

Related U.S. Application Data

(60) Provisional application No. 62/926,077, filed on Oct. 25, 2019.

(51) Int. Cl.
*H04L 41/0677* (2022.01)
*H04L 41/12* (2022.01)
*G06N 7/00* (2006.01)
*H04L 9/40* (2022.01)

(52) U.S. Cl.
CPC ......... *H04L 41/0677* (2013.01); *G06N 7/005* (2013.01); *H04L 41/12* (2013.01); *H04L 63/1416* (2013.01)

(58) Field of Classification Search
CPC . H04L 41/0677; H04L 41/12; H04L 63/1416; G06N 7/005; H02J 7/005
See application file for complete search history.

(56) References Cited

U.S. PATENT DOCUMENTS

| | | | |
|---|---|---|---|
| 7,002,260 B2 * | 2/2006 | Stahlkopf | H02J 3/32 290/44 |
| 10,311,442 B1 * | 6/2019 | Lancaster | G06Q 30/00 |
| 2013/0173667 A1 * | 7/2013 | Soderberg | G06T 11/206 707/798 |
| 2016/0004966 A1 * | 1/2016 | Flinn | G06N 5/04 706/46 |
| 2016/0087850 A1 * | 3/2016 | Doi | H04L 41/142 370/254 |
| 2020/0272905 A1 * | 8/2020 | Saripalli | G06N 3/006 |

* cited by examiner

*Primary Examiner* — Joseph L Greene
(74) *Attorney, Agent, or Firm* — Heslin Rothenberg Farley & Mesiti P.C.

(57) ABSTRACT

A computer-program product, a system, and a computer-implemented method include a processor(s) obtaining a configuration of a network including configurations of multiple network nodes and configurations of the network communication devices. The program code automatically models the network to generate a system model. The program code derives, from the system model, a loop-free Bayesian inference model, by generating a loop-free Bayesian network from the network.

16 Claims, 23 Drawing Sheets

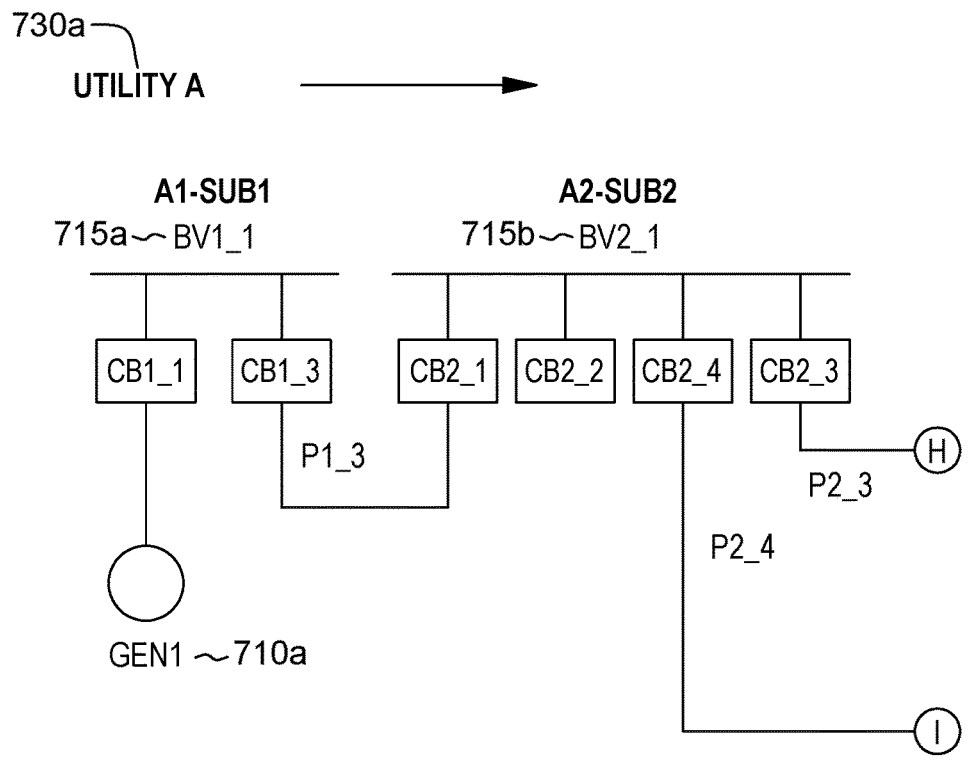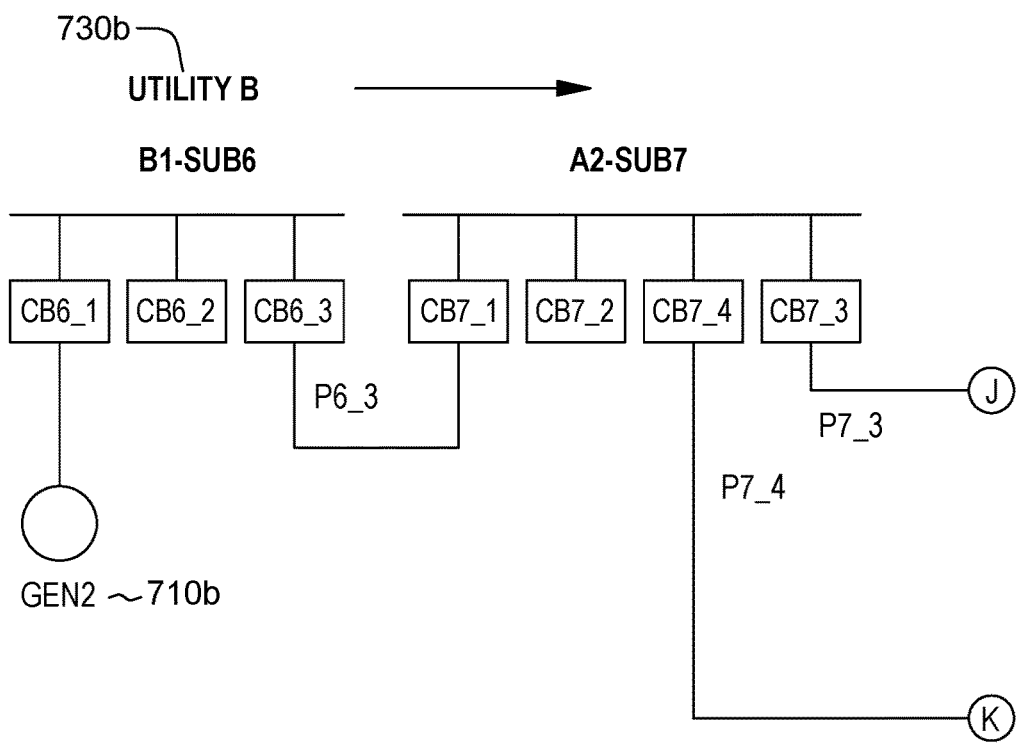
FIG. 7A

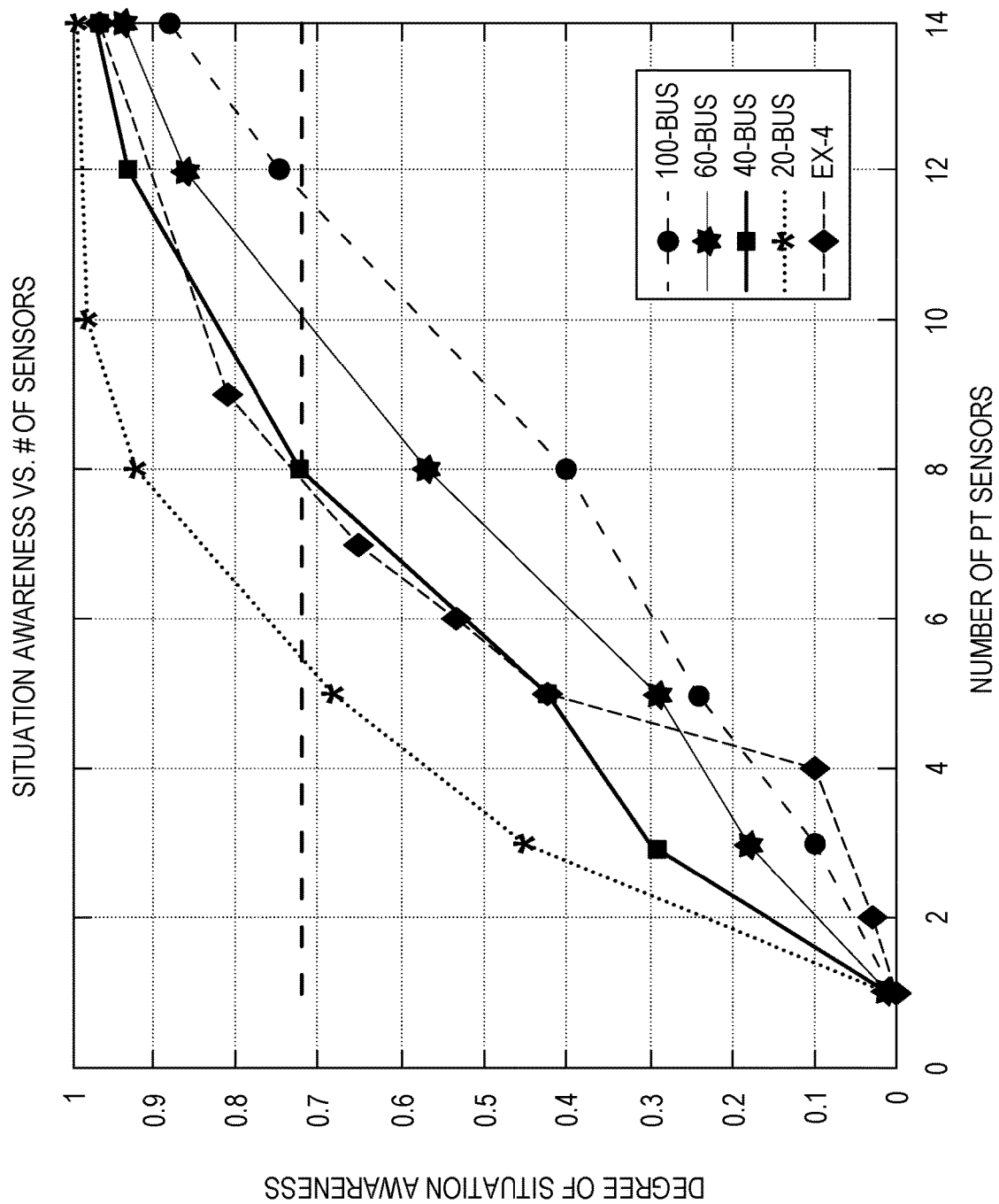

INDEPENDENT SITUATIONAL AWARENESS FOR A NETWORK

CROSS REFERENCE TO RELATED APPLICATION

This application claims priority to U.S. Provisional Application No. 62/926,077 filed Oct. 25, 2019, entitled, "INDEPENDENT SITUATIONAL AWARENESS FOR A NETWORK" which is incorporated herein by reference in its entirety.

GOVERNMENT RIGHTS STATEMENT

This invention was made with U.S. Government support under contract FA8750-16-C-0054 for the Defense Advanced Research Projects Agency (DARPA). The government has certain rights in the invention.

BACKGROUND

Life effectively comes to standstill when a blackout extends to about seven (7) days. Ripple effects include that water, sewer, and gas pipelines cease to function. Because of these failures and the duration of the blackout, emergency generators cannot be refueled, and may start breaking down from extended operation. Thus, not only is civilian life affected, our military defenses can also be affected. Extended blackouts due to denial of service (DoS) and other cyberattacks are not theoretical. While a Mar. 5, 2019, DoS attacks blinded supervisory control and data acquisition (SCADA) systems for some operators in California, Utah, and Wyoming, sophisticated malware has also downed parts of SCADA as well. Thus, in the absence of SCADA, aiding power recovery is problematic.

SUMMARY

Shortcomings of the prior art are overcome and additional advantages are provided through the provision of a method for determining situational awareness is a network. The method includes, for instance: obtaining, by one or more processors, a configuration of a network, wherein the network is a mesh network comprising multiple intertwining loops, and wherein the network comprises: multiple nodes; one or more sensors on a pre-determined portion of the multiple nodes, wherein the pre-determined portion comprises a number of nodes comprising a specific fraction of the multiple nodes; and one or more communication devices communicatively coupled to the one or more sensors to obtain measurements from the one or more sensors, wherein the configuration of the network comprises configurations of the multiple nodes and configurations of the communication devices; based on obtaining the configuration, automatically modeling, by the one or more processors, the network to generate a system model; and deriving, by the one or more processors, from the system model, a loop-free Bayesian inference model, wherein deriving the loop-free Bayesian inference model comprises generating a loop-free Bayesian network from the network.

Shortcomings of the prior art are overcome and additional advantages are provided through the provision of a computer program product for determining situational awareness is a network. The computer program product comprises a storage medium readable by a processing circuit and storing instructions for execution by the processing circuit for performing a method. The method includes, for instance: obtaining, by the one or more processors, a configuration of a network, wherein the network is a mesh network comprising multiple intertwining loops, and wherein the network comprises: multiple nodes; one or more sensors on a pre-determined portion of the multiple nodes, wherein the pre-determined portion comprises a number of nodes comprising a specific fraction of the multiple nodes; and one or more communication devices communicatively coupled to the one or more sensors to obtain measurements from the one or more sensors, wherein the configuration of the network comprises configurations of the multiple nodes and configurations of the communication devices; based on obtaining the configuration, automatically modeling, by the one or more processors, the network to generate a system model; and deriving, by the one or more processors, from the system model, a loop-free Bayesian inference model, wherein deriving the loop-free Bayesian inference model comprises generating a loop-free Bayesian network from the network.

Shortcomings of the prior art are overcome and additional advantages are provided through the provision of a system for determining situational awareness is a network. The system can include: a network comprising multiple nodes, wherein the network is a mesh network comprising multiple intertwining loops; one or more sensors deployed on a pre-determined portion of the multiple nodes, wherein the pre-determined portion comprises a number of nodes comprising a specific fraction of the multiple nodes; one or more communication devices communicatively coupled to the one or more sensors to obtain measurements from the one or more sensors; a memory; one or more processors communicatively coupled to the one or more sensors and in communication with the memory; and program instructions executable by the one or more processors, via the memory, to perform a method, the method comprising: obtaining, by the one or more processors, a configuration of the network, wherein the configuration of the network comprises configurations of the multiple nodes and configurations of the communication devices; based on obtaining the configuration, automatically modeling, by the one or more processors, the network to generate a system model; and deriving, by the one or more processors, from the system model, a loop-free Bayesian inference model, wherein deriving the loop-free Bayesian inference model comprises generating a loop-free Bayesian network from the network.

Methods, systems, and computer program products relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7C (referred to collectively herein as FIG. 7) illustrates how aspects of some embodiments the present invention can be utilized to model an alternative network in the event of a black start;

FIG. 13 is an example of a grid topology generated for use in embodiments of the present invention;

FIG. 15 is an example of sensor results in various situations that can be utilized in some embodiments of the present invention;

DETAILED DESCRIPTION

Figure 1A:
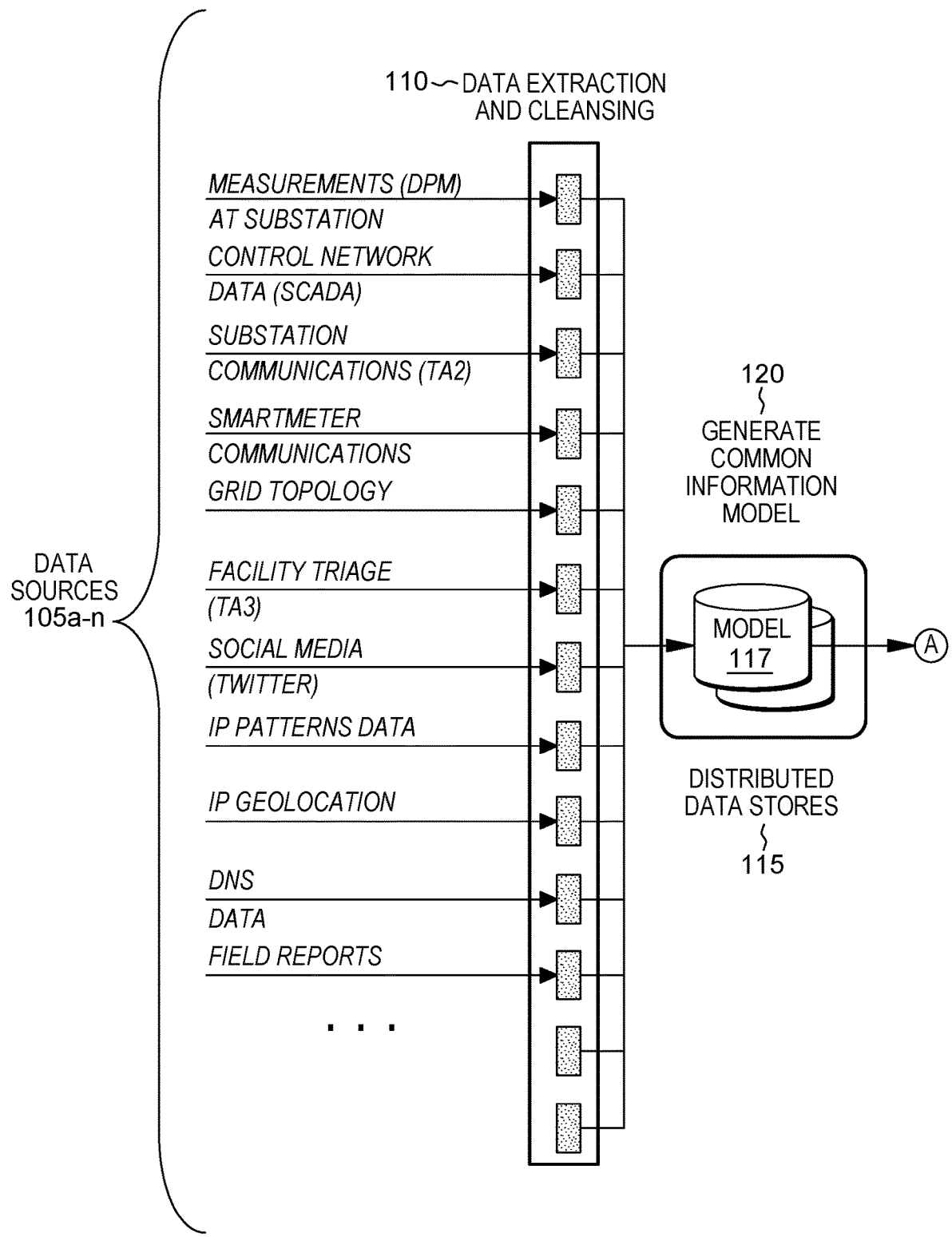
FIGS. 1A-1B (collectively referred to herein as FIG. 1) are a model that depicts various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code.

The power grid is a network for the delivery of electricity made up of various components such as generating stations, transmission lines, distributions lines connecting electrical loads, circuit-breakers, transformers, and other electrical devices. The management of the power grid can be achieved through the use of supervisory and control systems that (i) collect telemetry from the power grid elements via current and voltage signal sensing devices, and (ii) utilize controllers and actuators which were deployed to enable remote operators to switch on and off grid components, and otherwise modify the operation of grid components and devices to ensure balance between supply and demand of electricity, system stability, and overall efficiency. Many utilities employ supervisory control and data acquisition (SCADA) systems, which are built according to well-established standards. Most SCADA systems today, at the minimum, will contain components such as supervisory computers, remote terminal units (RTU), programmable logic controllers, communication infrastructure, and human-machine interfaces. The sustained control and management of the power grid depends on the correct functioning and operation of such SCADA systems as without such SCADA support, the power grid cannot be managed. In the current mode of operation, during such emergency events, obtaining grid data would require dispatching power engineers to substations to collect power measurements, which is time consuming, and often insufficient or not timely.

Embodiments of the present invention include a computer-implemented method, a computer program product, and a computer system that can include a combination of hardware and software where program code executing on at least one processor manages a network, such as a power grid, when regular systems, such as SCADA systems, in the case of the power grid, are at least partially unavailable, or untrustworthy. The unavailability of the SCADA systems is considered an extreme circumstance and can occur for an interval of time. SCADA systems can become unavailable due to a variety of emergency situations, including but not limited to, extreme weather events, cyber-attacks, etc. Other components in the power grid, such as Relay, Circuit Breaker, can also be subject to cyberattacks, which render incorrect operation of the power grid. These situations potentially disable not only the control systems and/or their associated communications, but significant portions of the grid itself. In this eventuality, power grid operators can rely on local operators to manually control the grid equipment utilizing various aspects of some embodiments of the present invention. The operators can utilize these aspects, which are described below, as alternative mechanisms to collect telemetry, so that overall power grid situation awareness (SA) is maintained in the process of power restoration. Thus, embodiments of the present invention provide situational awareness in a power grid, which is particularly useful during emergency situations when SCADA systems are compromised. Situation awareness is achieved at multiple abstraction levels, including the power grid physical components (e.g., circuit breakers, voltages and currents), communication and control network (e.g., routers, remote terminal units (RTUs)), and cyber (e.g., malware) components. Aspects of some embodiments of the present invention provide trusted knowledge of the power grid network utilized in making operational decisions.

Embodiments of the present invention include a computer-program product, a system, and a computer-implemented method include a processor(s) obtaining a configuration of a network including configurations of multiple network nodes and configurations of the network communication devices. The program code automatically models the network to generate a system model. The program code derives, from the system model, a loop-free Bayesian inference model, by generating a loop-free Bayesian network from the network. The loop-free Bayesian inference model uses fraction of sensed nodes, to infer missing states of the network, and to provide situational awareness for the entire network.

Embodiments of the system, method, and computer program product of the present invention include one or more processors that execute program code that rapidly establishes a crank-path in a black start scenario subject to cyberattacks on circuit breakers, relays, substation control and/or communication components. By collecting data from alternative sensors (referred to as out-of-band telemetry) and inferring the state of the grid, the program code provides one or more of: 1) situational awareness (SA) for rapid crank-path establishment and recovery detection of compromised components; 2) increased avoidance of detected compromised components; and 3) targeted dispatch of cleansing operations to regain trusted control. To this end, embodiments of the present invention provide an out-of-band grid telemetry over a secure emergency network to support responders during a cyber black start. In some embodiments of the present invention, the out-of-band grid telemetry serves as emergency read-only SA until reliable SCADA/EMS (emergency management system) capability is restored. In embodiments of the present invention, the program code can determine a location of an event in a network or grid (malware, cyberattack, fault, etc.) and display or otherwise indicate this location to a user. In some embodiments of the present invention, the program code, upon locating the event (e.g., malware, cyberattack, fault, etc.) can mitigate the event.

Embodiments of the present invention provide situational awareness by utilizing an out-of-band sensing and/or networks when traditional systems, such as SCADA, are unavailable. As described herein, embodiments of the present invention include a method for determining the placement of a minimal number of sensors to form this out-of-band network as well as a method of utilizing the data produced from the minimal number of sensors to produce a fuller view of the network/grid as a whole. Aspects of embodiments of the present invention include, but are not limited to: 1) a set of sensors (measuring entities including three-phase voltage, three-phase current, three-phase active and reactive power, frequency) that can be (easily and non-invasively) deployed at or near substations; 2) a set of communication hubs deployed per substation such that the hubs interface with the voltage and current sensors, and collect their measurements using a sensor data collection protocol; 3) a communications server that interfaces with the communication hubs, and collects the measurements of the communication hubs using a robust secure communications protocol; 4) a system modeler that takes the configuration of substations and the transmission lines connecting them, and forms an electrical model of the grid; 5) a Bayesian inference model (Bayesian models are fundamentally cause-and-effect) derived from the system model, which uses statistical inference to fill in missing measurements, and generates root cause analyses indicating the location of system faults, and/or the location of a cyberattack (induced by the extreme event); and 6) a visualization interface that displays the power status of the electrical model based on the measurements and inferred physical values. In embodiments of the present invention, the program code not only utilizes the deployed out-of-band network elements, it also determines the structural elements and locations of these elements such that a minimal out-of-band network can be utilized by the program code to provide situational awareness across the whole of a network/grid. In embodiments of the present invention, the deployed out-of-band network elements can locate and/or isolate a cyberattack in the network/grid itself.

As will be discussed herein, embodiments of the present invention utilize various aspects to implement the inference and solution approach described herein, including but not limited to: 1) Bayesian Networks (BNs); 2) the application of BNs to electrical power grids and the incorporation of the laws of power grid circuits and power flow to constrain the BN; 3) transformation of BN loops (which hiders causality) into loop-free BNs; 4) hierarchical modeling of BNs; 5) virtual variables to eliminate loops; 6) integration of non-power grid but related (out-of-band) measurements; and/or 7) algorithm(s) and approach(es) for auto-generation of large scale Bayesian networks. As understood by one of skill in the art, power grids are inherently mesh networks consisting of multiple intertwining loops and in embodiments of the present invention, the program code creates a loop-free BN from a power grid.

Embodiments of the present invention are inextricably linked to computing and provide a practical application. Various aspects of some embodiments of the present invention are inextricably tied to computing, including but not limited to, program code executing on one or more processors leveraging information from multiple heterogeneous out-of-band (OOB) sources (electrical, social media, field reports, IP host status) using BNs. Additionally, in various embodiments of the present invention, program code integrates the Bayesian inference model with the dynamics of the electrical grid, which is governed by power flow equations and fills in the missing sensor data, both deterministically and probabilistically. Program code in embodiments of the present invention merges different abstract views (e.g., circuit power flow, network topology, breaker control, malware, and root causes) and allows inference across different layers of abstraction. Embodiments of the present invention provide a practical application because use of these embodiments saves resources (e.g., sensor hardware, installation, number of dispatches), enables much improved situation awareness (when compared with existing methods), enables better decision-making during emergencies, including but not limited to, finding alternate black start routes that reduce power grid down-time and increase a likelihood of recovery.

Figure 1B:
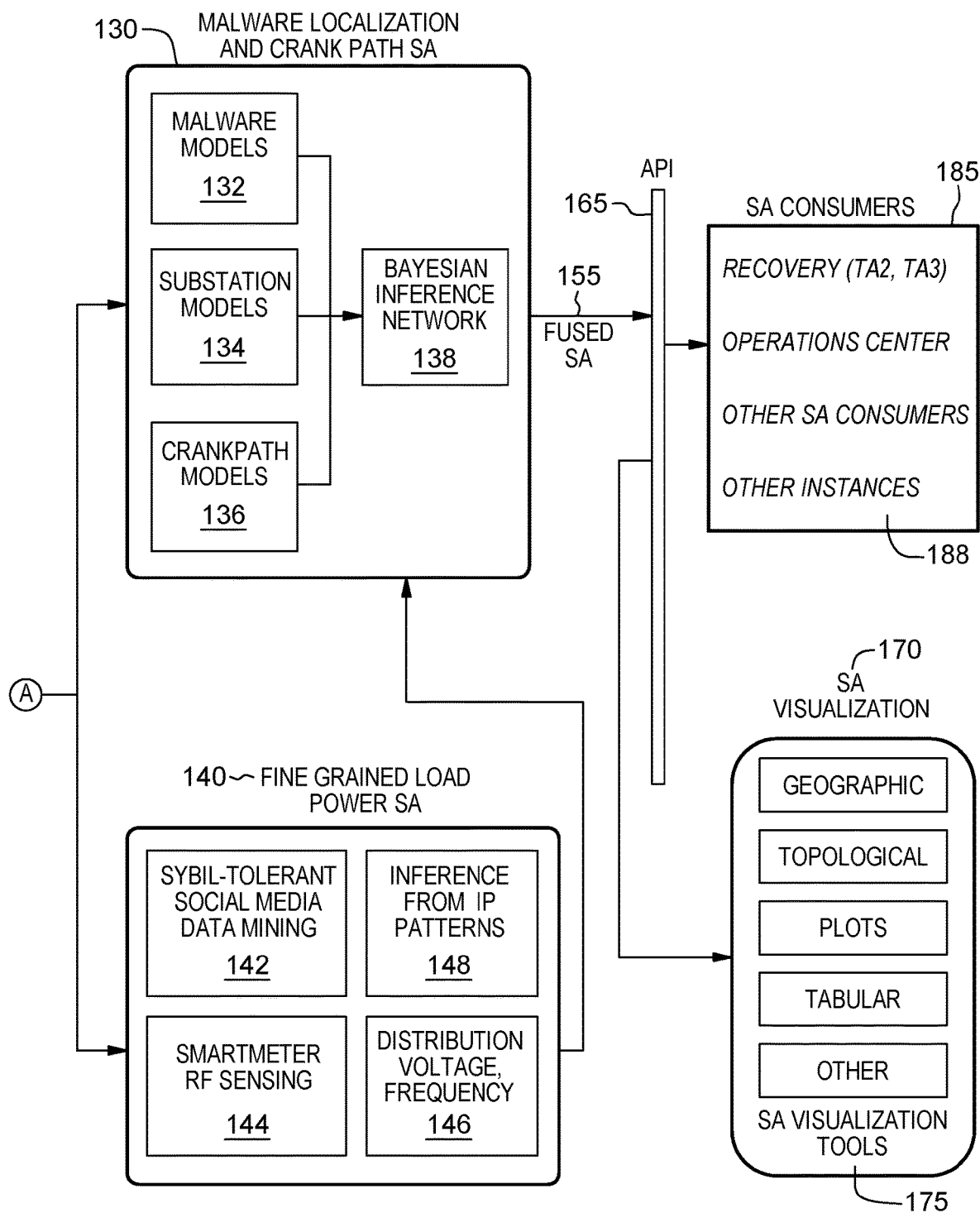

FIGS. 1A-1B (collectively referred to herein as FIG. 1) are a model 100 that depicts various aspects of some embodiments of the present invention. FIG. 1 depicts the fusion of multiple diverse sources for power/cyber status inferences. In embodiments of the present invention, as depicted in FIG. 1, program code executing on at least one processor extracts and cleanses data (110) from a variety of data sources 105a-n. In this example, data sources are provided for illustrative purposes only in order to demonstrate that these sources can include, but not limited to, measurements of distributed power management (DPM) at substation, control network data (SCADA), substation communications (TA2), smart meter communications, grid topology, facility triage (TA3), social media (e.g., Twitter), Internet Protocol (IP) patterns data, IP geolocation, domain name system (DNS) data, field reports, etc. As illustrated in FIG. 1, program code in various embodiments of the present invention generates a common information model (120).

The common information model 117 can be stored in distributed data sources, including but not limited to the distributed data stores 115 pictured.

After generating the common information model 117, in some embodiments of the present invention, the program code then facilitates: 1) malware localization and crank path SA (130); and 2) fine grained load power SA (140). Various aspects that can be included in these facilitated actions are illustrated in FIG. 1. In the example illustrated in FIG. 1 (which is provided for illustrative purposes only to show a possible configuration of aspects of some embodiments of the present invention), to facilitate malware localization and crank path SA (130) the program code utilizes malware models 132, substation models 134, and crank path models 136 to derive a Bayesian inference network 138. To facilitate fine grained load power SA (140), in some embodiments of the present invention, including the example in FIG. 1, the program code employs Sybil-tolerant social media mining 142, smart meter RF sensing 144, distribution of voltage and frequency 146, and makes inferences from IP data patterns 148. The program code provides the results of the fine grained load power SA (140) to the program code engaged in facilitating malware localization and crank path SA (130).

In embodiments of the present invention, the program code-generated BN model of a crank path (e.g., FIG. 1, 130) provides situation awareness when the power grid is undergoing issues, including but not limited to, recovering from a complete blackout (i.e., black start). A black start refers to a situation during a wide-area or long-standing outage, where off-site power is not available to re-start a part of the grid that is down; hence and a so-called black start needs to be performed to bootstrap the power grid into operation without use of the external power transmission network. The BN model generated by and applied in embodiments of the present invention is driven by voltage and current measurements collected at different points within the crank path, and can provide a probabilistic characterization of the states of different elements within the crank path, including but not limited to, circuit breakers, buses, or lines. Because a blackout can be caused by a combination of physical attacks and cyberattacks on the power grid, the normal measurements provided by the SCADA system are likely to be corrupted and thus become unreliable. Thus, in embodiments of the present invention, the program code obtains alternative measurements by deploying a reliable metering system and a communication network that operates outside the SCADA system. The BN model generated and applied in embodiments of the present invention has the flexibility to operate with both the normal SCADA-based measurements, as well as alternative measurements likely to be used during black starts.

Returning to FIG. 1, in some embodiments of the present invention, a fused SA 155 is provided to an application programming interface (API) 165 (comprising program code in some embodiments of the present invention) and the program code of the API 165 provides visualization tools 175 to visualize the SA (170), through a user interface. As illustrated in FIG. 1, the visualization tools 175 can include tools to visualize data based on various attributes, including but not limited to, geographic, topological, plots, tabular, and others (as illustrated in FIG. 1). Via the API 165, SA consumers 185 can utilize the visualization 170 for recovery (TA2, TA3), in an operations center, for other SA consumers, and can coordinate with other instances of the API 165.

As noted above, FIG. 1 lists various consumers of the SA 185 that can be provided by the program code. Thus, the program code provides real-time SA during a grid bootstrap by: 1) detecting compromised components; 2) enabling recovery operations to avoid compromised components; and/or 3) enabling the targeted dispatch of cleansing operations to regain trusted control of compromised components and regions of the power grid.

Figure 2:
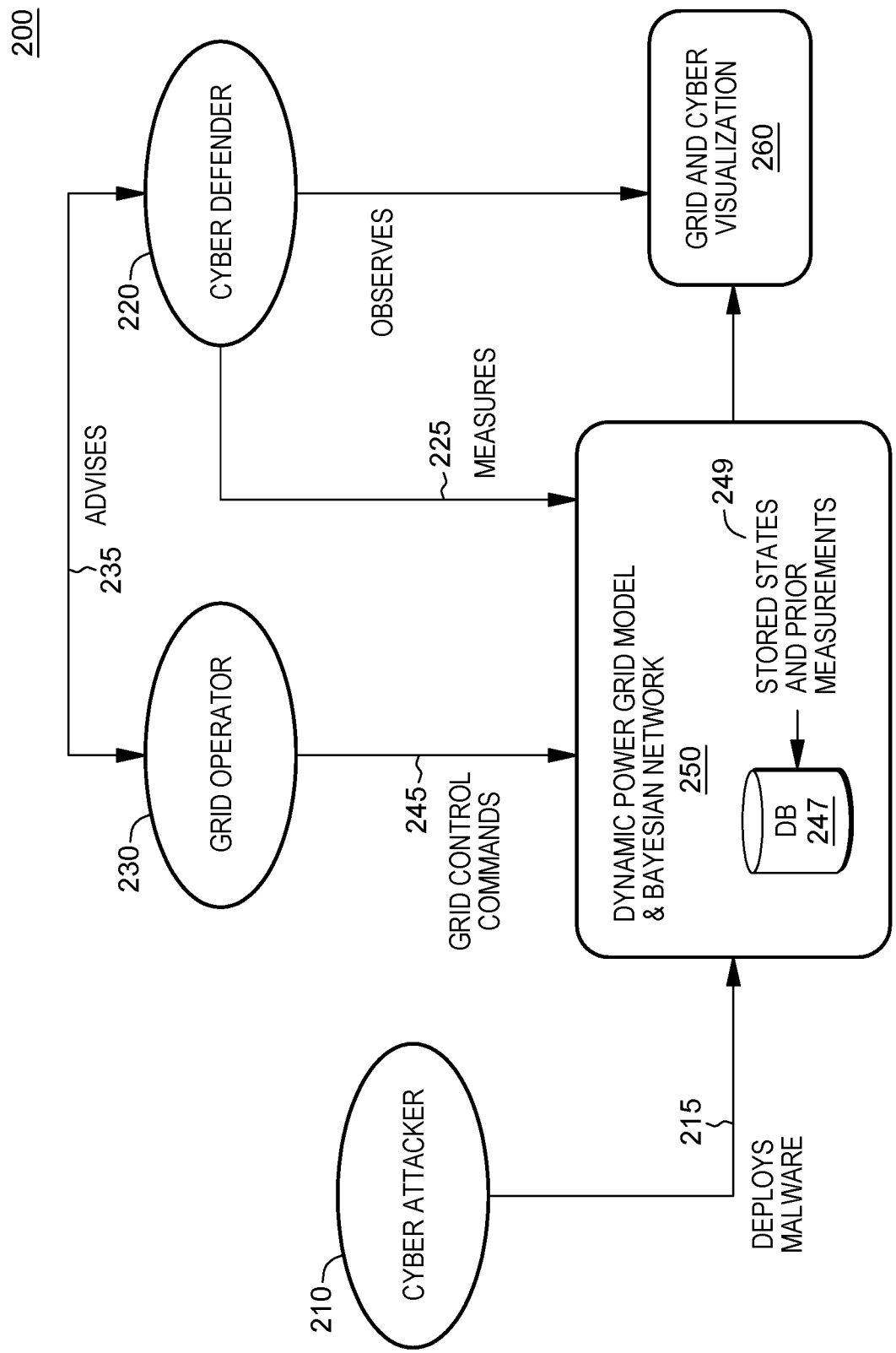
FIG. 2 is a workflow that illustrates various aspects of some embodiments of the present invention.

FIG. 2 is a workflow 200 that illustrates various aspects of some embodiments of the present invention. This workflow is a more detailed view of the malware localization and crank path SA of FIG. 1 (e.g., FIG. 1, 130). As illustrated in FIG. 2, an attacker 210 injects programmed malware (215) at selected breaker controllers. A defender 220 interactively tries to localize malware (e.g., by taking measurements (225) and advising (235) an operator 230 (235)). Program code updates power grid and cyber states (of the dynamic power grid model and BN 150) based on the defender 220 and operator 230 actions, including instituting grid control commands (245). The program code stores current states (of breakers) and current observations 249 (e.g., evidence) (e.g., in a database 247). The program code (model 250) continues running until the malware has been localized and cleansed. As in FIG. 1, an API (not pictured) enables grid and cyber visualization 260 by SA consumers.

Figure 3A:
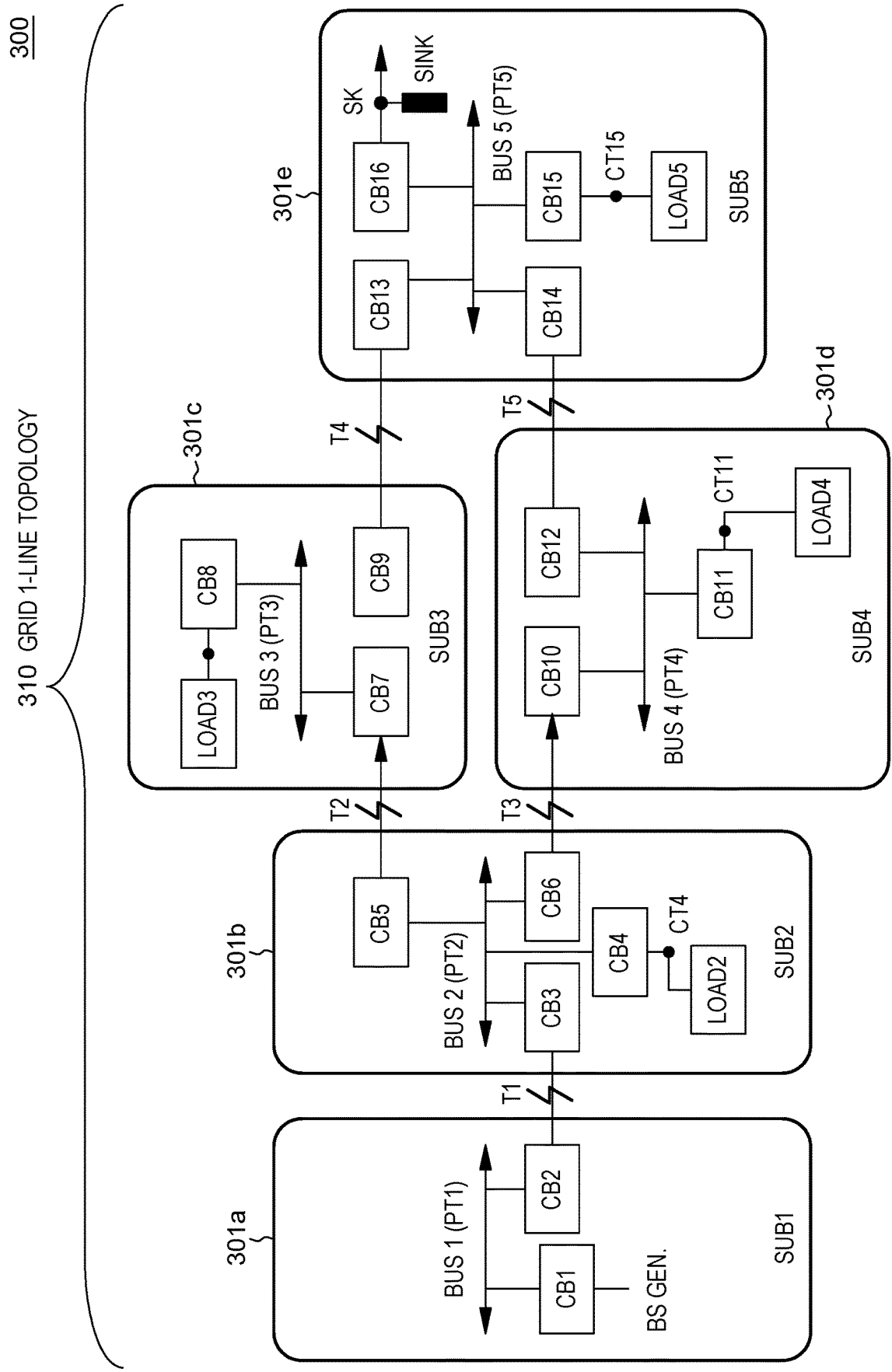
FIGS. 3A-3B (referred to collectively herein as FIG. 3) depicts aspects of is an example of a type of delimited array generated in some embodiments of the present invention.
Figure 3B:
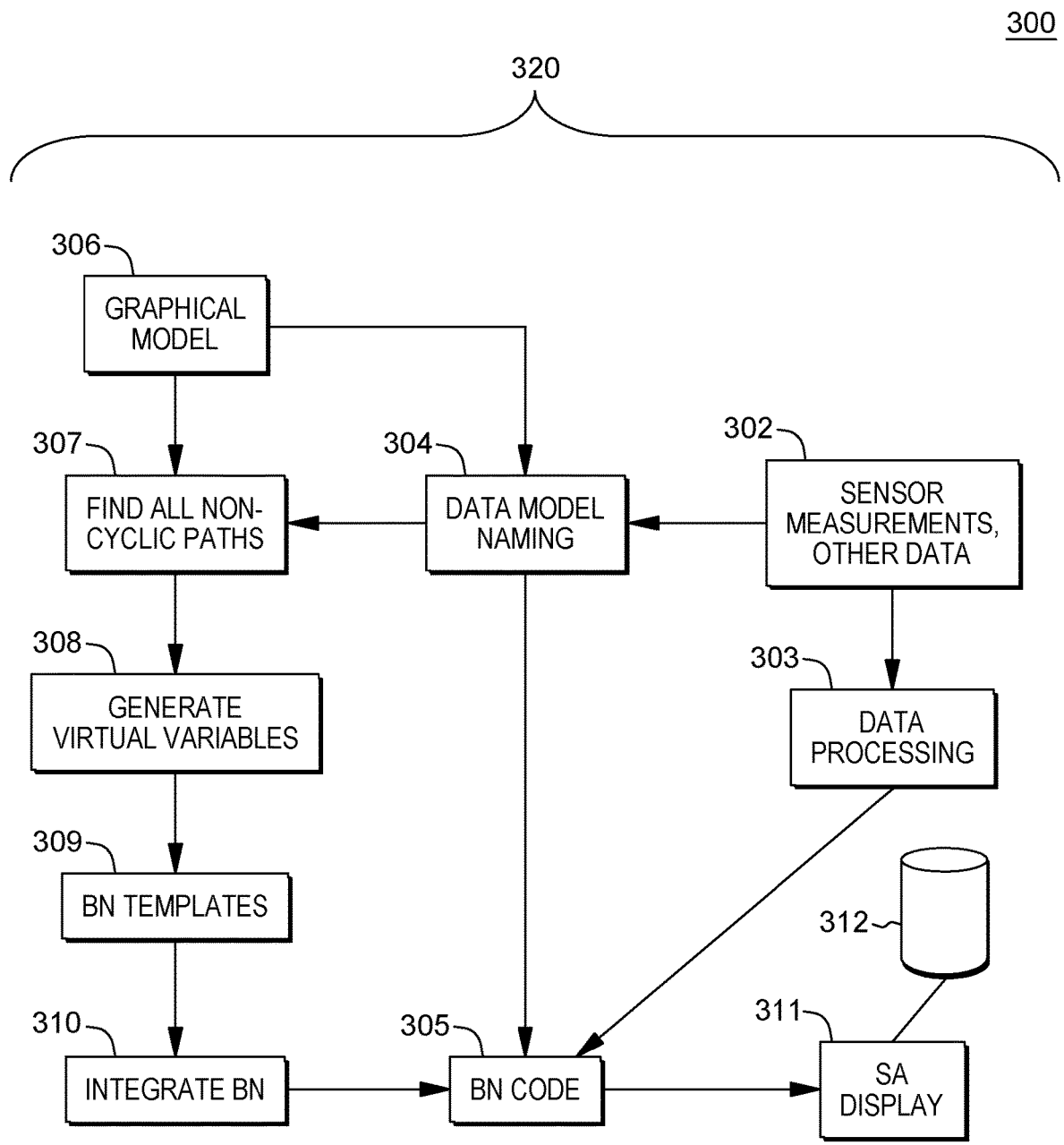

FIGS. 3A-3B (referred to collectively herein as FIG. 3) provide an overview 300 of how various embodiments of the present invention provide out-of-band grid telemetry over a secure emergency network to support responders during cyber black start, serving as emergency read-only SA until reliable SCADA/EMS capability is restored. FIG. 3 illustrates automatic Bayesian inference generation and operation by the program code in some embodiments of the present invention. The functionality of embodiments of the present invention, which is illustrated, in part, in FIG. 3, can be understood as an alternative sensing capability that is independent of current power grid SCADA systems. FIG. 3 illustrates program code in embodiments of the present invention collecting state information (e.g., when SCADA is unavailable) from power sensors and non-grid sources to generate a physical model, an inference model of the grid 310 (for which the line topology is included in FIG. 3). In some embodiments of the present invention, this data is collected from easily installed, non-invasive sensors at selected substations. The program code utilizes the model to determine cause and effect inference from sparse measurements. Based on the determined interference, the program code provide real-time cyber-physical situational awareness (e.g., to a user through an interface). As discussed below, in embodiments of the present invention, once the inferences are computed (utilizing the (Bayesian) model), the program code presents the result in a graphical user interface (GUI). In some embodiments of the present invention, the GUI is a display tool that takes the element state probabilities calculated by the model as its input, and displays them in a form that is more accessible for utility operators to comprehend. In some embodiments of the present invention, the program code streams the sensed data to remote EMS centers.

Referring to FIG. 3 a grid, which is represented by a grid 1-line topology 310, includes five (5) substations 301a-301e where the buses (potential transformers (PTs)) are located. The number of substations are provided for illustrative purposes as an example. In the grid 1-line topology 310, various additional aspects of the grid (network) are also represented. These aspects can be understood as certain critical black start attributes and hence, Bayesian variables. These aspects include generators (Gen), circuit breaker state (CBn, where "n" is a number), PT measurements (PTn, where "n" is a number), and loads (Loadn, where "n" is a number). Another aspect of which is not pictured in FIG. 3 and can be a critical black start attribute and hence, a Bayesian variable in various embodiments of the present invention, is bus voltage.

A flow chart of the automatic generation of the inference model 320 (by program code in embodiments of the present invention) is also depicted in FIG. 3. The inference model is based on a BN and is deployed to infer network states (circuit breaker status, bus voltage and current). This BN is a loop-free Bayesian-based grid inference model that differs from traditional Bayesian inference as it is adapted to model the cause-and-effect of the power flow in a power grid. In contrast, a straightforward application of Bayesian inference to model power flow runs into the problem of forming loops, as the grid network is full of loops. The program code in embodiments of the present invention generates and applies the BN model to: 1) fill in missing sensor data; 2) correlate breaker states and potential transformer (PT) and current transformer (CT) measurements and check for consistency; and/or 3) provide overall situational awareness. Regarding the first item, the BN enables use of sparse sensors so that not every PT and CT is needed. In addition, if the sensor data are missing, possibly due to bad connections or inaccessibility, the BN can fill in the missing state of the measurement, via the program code making inferences.

In embodiments of the present invention, the program code generates and applies a version of a BN that utilizes "virtual variable excitation" in a graphical analysis to solve this loop problem, resulting in a BN inferences model that varies from a traditional model in at least two aspects. First, in embodiments of the present invention, the BN has a one-to-one correspondence with the physical Grid network (represented by the grid 1-line topology 310). This correlation enables the program code to generate a model that pin-points location of failure or cyber-attack points. In contrast, traditional Bayesian implementation is usually an abstraction of the physical entities and does not possess the aforementioned relationship. Second, in this application, a BN utilizes an acyclic graph structure in which cause-and-effect events are directional and have no loops. Without this loop-free condition, the BN will not provide accurate inferences and will, in fact, provide incorrect inferences. However, traditional ways of applying a BN to model the power grid would not satisfy this loop-free condition. Power grid operation is governed by a set of non-linear power flow equations and the grid topology is generally of a mesh network (which has loops). Therefore, applying a BN to a grid network directly would form loops. Thus, in embodiments of the present invention, rather than making this direct application (which would be generate inconsistent inference results), the program code graphically analyzes the network (e.g., that of a crank path in a black start scenario) to decompose potential loops into acyclic paths. The acyclic paths would be implemented by a mechanism called virtual variable excitation, which generates a BN that is loop-free and creates a genuine representation of the cause-and-effect model of the power flow of the power grid.

Figure 14A:
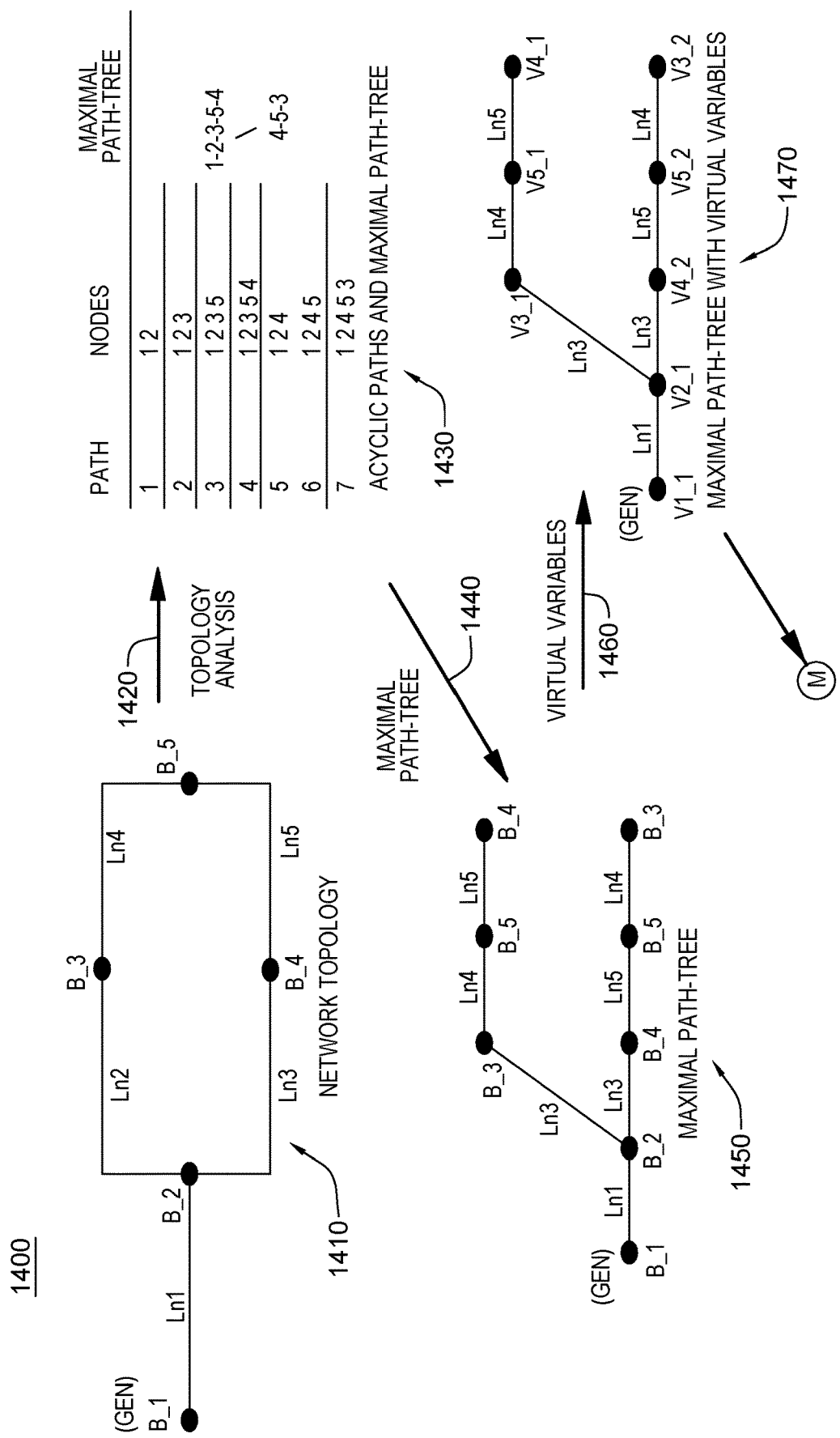
FIGS. 14A-14B (referred to collectively herein as FIG. 14) illustrate the generation of a loop-free Bayesian Network (BN) in accordance with some embodiments of the present invention.
Figure 14B:
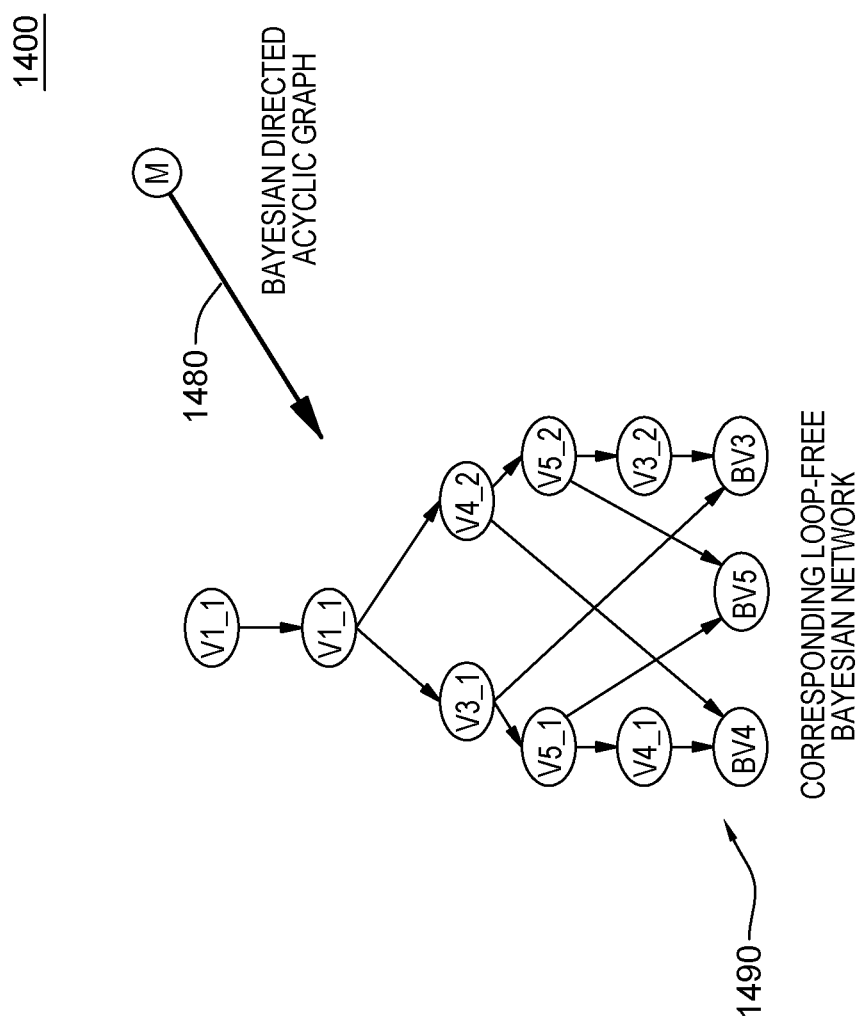

As understood by one of skill in the art and discussed above, alternate paths in a grid (e.g., between substations) induces loops. Embodiments of the present invention solve this BN loop issue by identifying a maximal path-tree with virtual variables and generating a corresponding loop-free BN. Aspects of the method 1400 by which the program code in embodiments of the present invention generates of a loop-free BN are illustrated in FIGS. 14A-14B (referred to collectively herein as FIG. 14). FIG. 14 includes a network topology 1410 which program code (executed by at least one processor) analyzes and determines (1420), from the topology, a maximal tree path among the nodes. These derived paths are provided, for illustrative purposes only, in a table of acyclic paths and maximal tree paths 1430. Based on the topology analysis (1420), the program code generates (1440) a maximal tree path 1450. The program code obtains virtual variables from the maximal tree path 1450 (1460) and generates a maximal tree path with these virtual variables 1470. The program code applies (1480) a Bayesian directed acyclic graph to generate a corresponding loop-free BN 1490.

Figure 4:
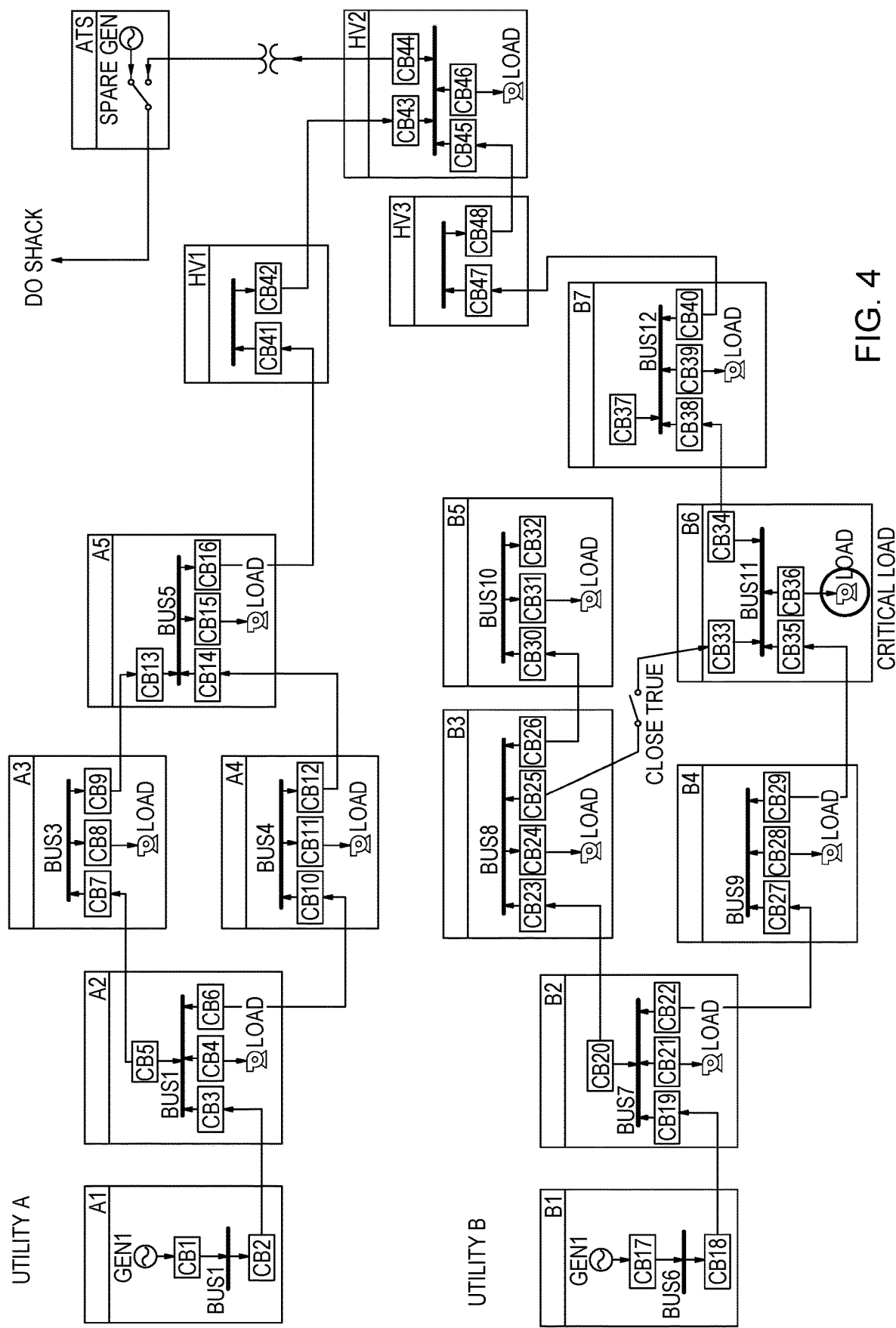
FIG. 4 is an example of this 1-line topology diagram utilized in embodiments of the present invention to generate a Bayesian Network (BN) model.

Returning to FIG. 3, in embodiments of the present invention, the program code automatically generates a BN model. As illustrated in FIG. 3, in embodiments of the present invention, in the low chart of the automatic generation of the inference model 320, the program code (executed by one or more processors) obtains sensor measurements and other data 302 from a grid (as illustrated by the grid 1-line topology 310). The program code processes these data to generate BN code 305, in some embodiments of the present invention. As explained herein, the program code can obtain this grid topology based on reading an input file describing the topology and the content of the grid elements. The program code can model and name the data 304 content. The modeled data is obtained by the program code from the sensor measurements and other data 302 and a graphical model 306 generated by the program code from the grid 1-line topology 310. Utilizing the named data model 304 and the graphical model 306, the program code locates all non-cyclical paths 307 to generate virtual variables 308 and uses predefined BN templates 309 to integrate the BN 310. The program code can convert the integrated BN 310 into BN code 305. As illustrated in FIG. 1, the SA is displayed 311 by the program code (e.g., utilizing an API) and a visualization graphical user interface (GUI). The displayed data is stored in a database 312 backend to this GUI, in some embodiments of the present invention. Because virtual variables are algorithmically generated from 1-line topology, the BN utilized in embodiments of the present invention can be auto-generated from software without manual construction. FIG. 3 illustrated various functionalities of some embodiments of the present invention utilizing a grid (network) with a simple topology (i.e., a 5-node topology), however, this automatic generation of a BN by program code in embodiments of the present invention is also applicable on more complex networks (grids) with more complex topologies. FIG. 4 is a network 400 (grid) that is provided as another example of a grid from which virtual variables can be automatically generated by program code in embodiments of the present invention. FIG. 4 is an example of a 1-line topology diagram of a more complex network (grid) 400. Aspects of embodiments of the present invention can be implemented in large networks, where thousands of Bayesian variables are common. The automation of BN in embodiments of the present invention enables practical and scalable operation.

Figure 5A:
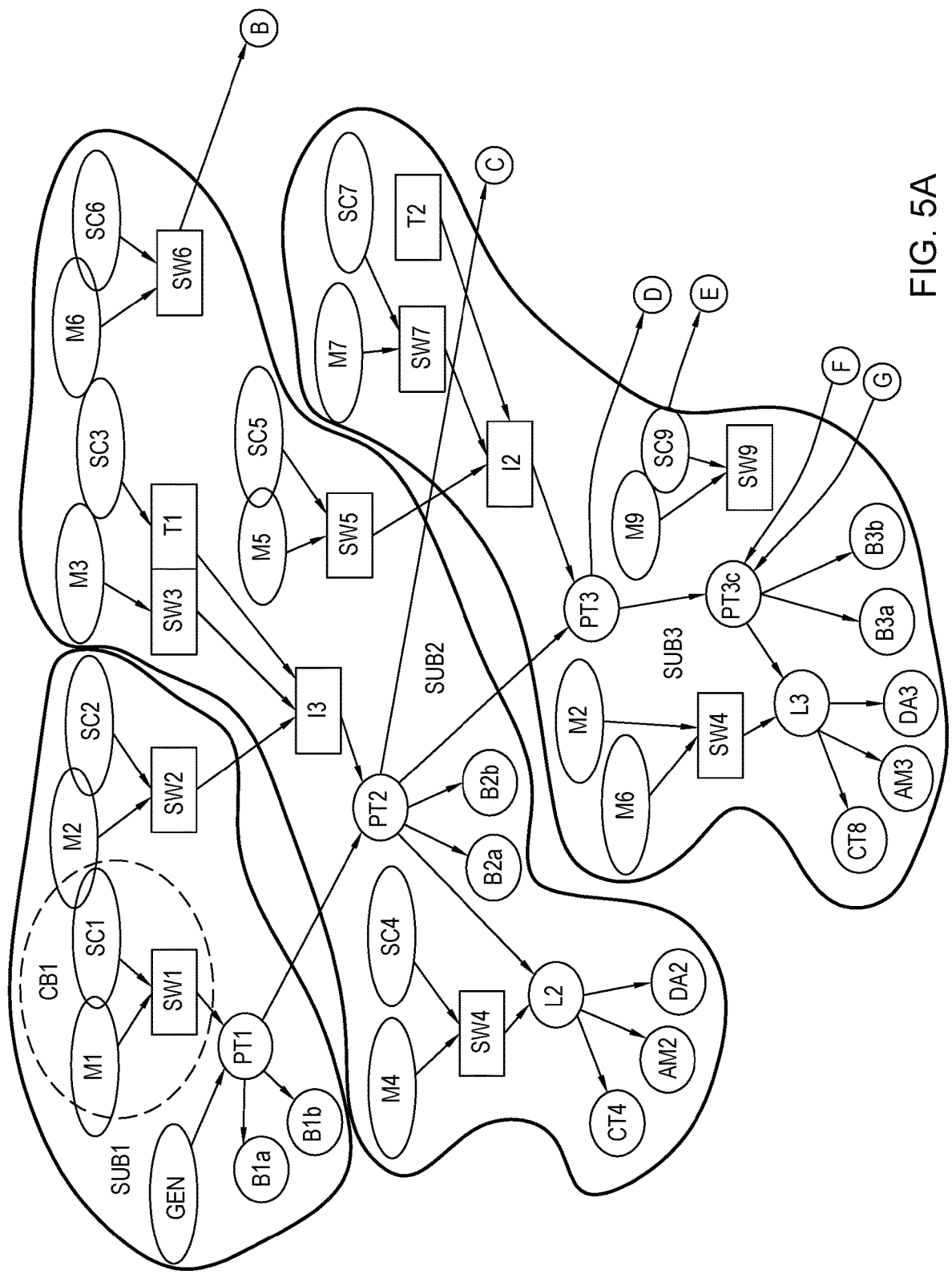
FIGS. 5A-5B (referred to collectively herein as FIG. 5) depict an example of aspects of a backend of embodiments of the present invention.
Figure 5B:
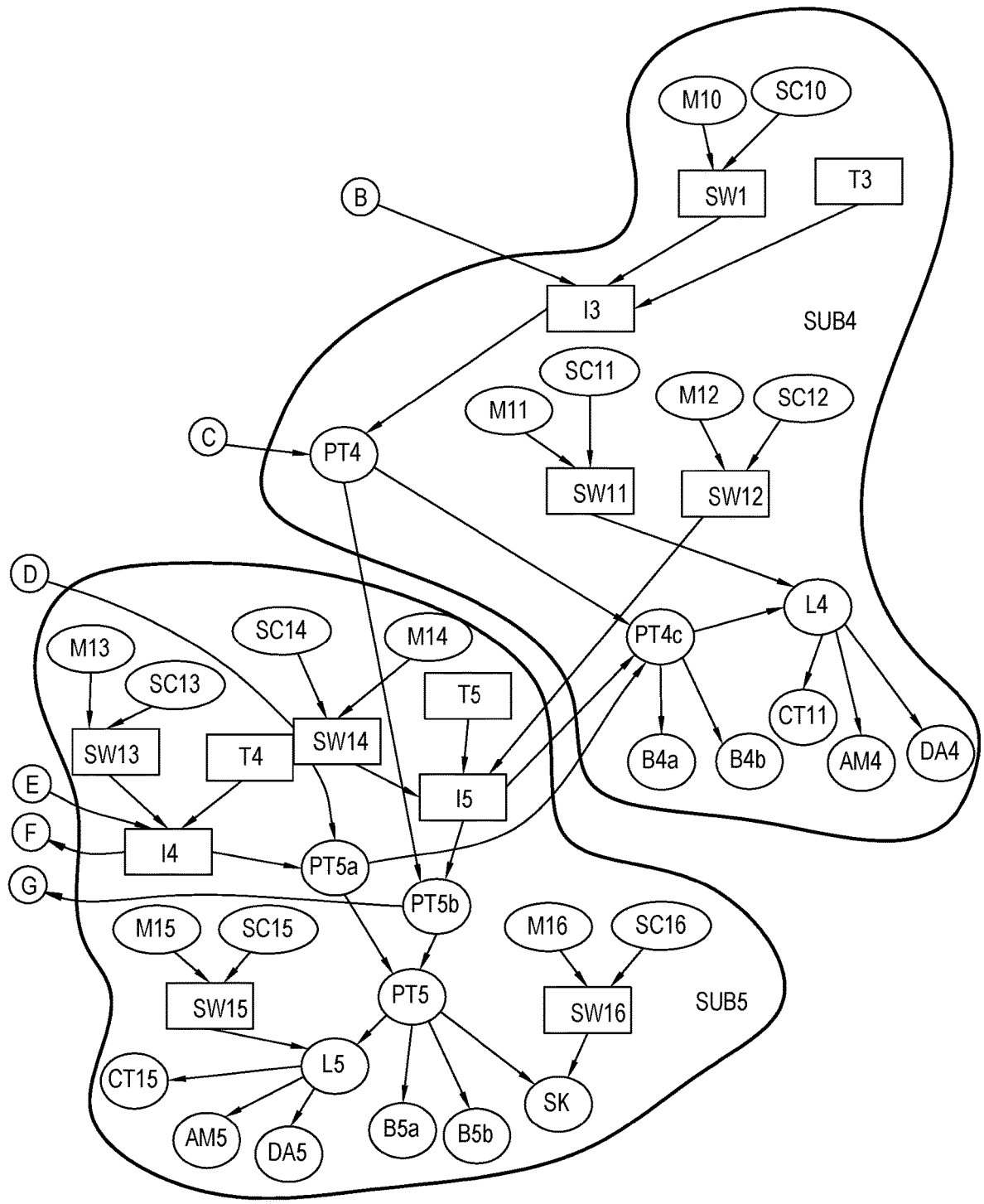

FIGS. 5A-5B (referred to herein collectively as FIG. 5) are an example of what can be considered a backend of embodiments of the present invention, a BN inference engine for five (5) substations (this number is used as an example and for illustrative purposes only) SUB1, SUB2, SUB3, SUB4, and SUB5. The arrows in FIG. 5 show the direction of cause-and-effect, which can be seen to be loop-free. Specifically, FIG. 5 illustrates the BN representation of the basic elements of Utility A of FIG. 4. The arrows in FIG. 5 illustrate the direction of the cause and effect, which is seen to be loop-free (as generated by the program code in embodiments of the present invention).

Following the flows in FIG. 5, as well as in the relevant portion of FIG. 4, one notes that the flow of power moves from a generator, to a first bus, and then to a second bus, such that it can be split and recombined again. This recombination in a flow can create a loop, thus creating the aforementioned looping issue. Thus, as illustrated in FIG. 5, each PT (e.g., PT1, PT2, PT3, PT4, PT4c, PT3c, PT5, PT5a, and PT5b) acts as an anchor point which does not form any loops. The various elements of Utility A are also represented in FIG. 5, including switches (SWn, n=numbers represented in FIG. 5, which is synonym for CB (circuit breaker)), which represents circuit breaker n. In FIG. 5, SCn represents the switch command, which controls the switch state during normal operation. Mn represents malware that can adversely impact the switch state of SWSUBn, illustrating how state can be impacted (changed) by aspects other than a switch command SCn itself. Loads (Ln) are also represented in FIG. 5, as well as smart meters (AMn), Current Transformer (CTn)—the basic elements of Utility A in FIG. 4 are provided in FIG. 5.

Figure 6:
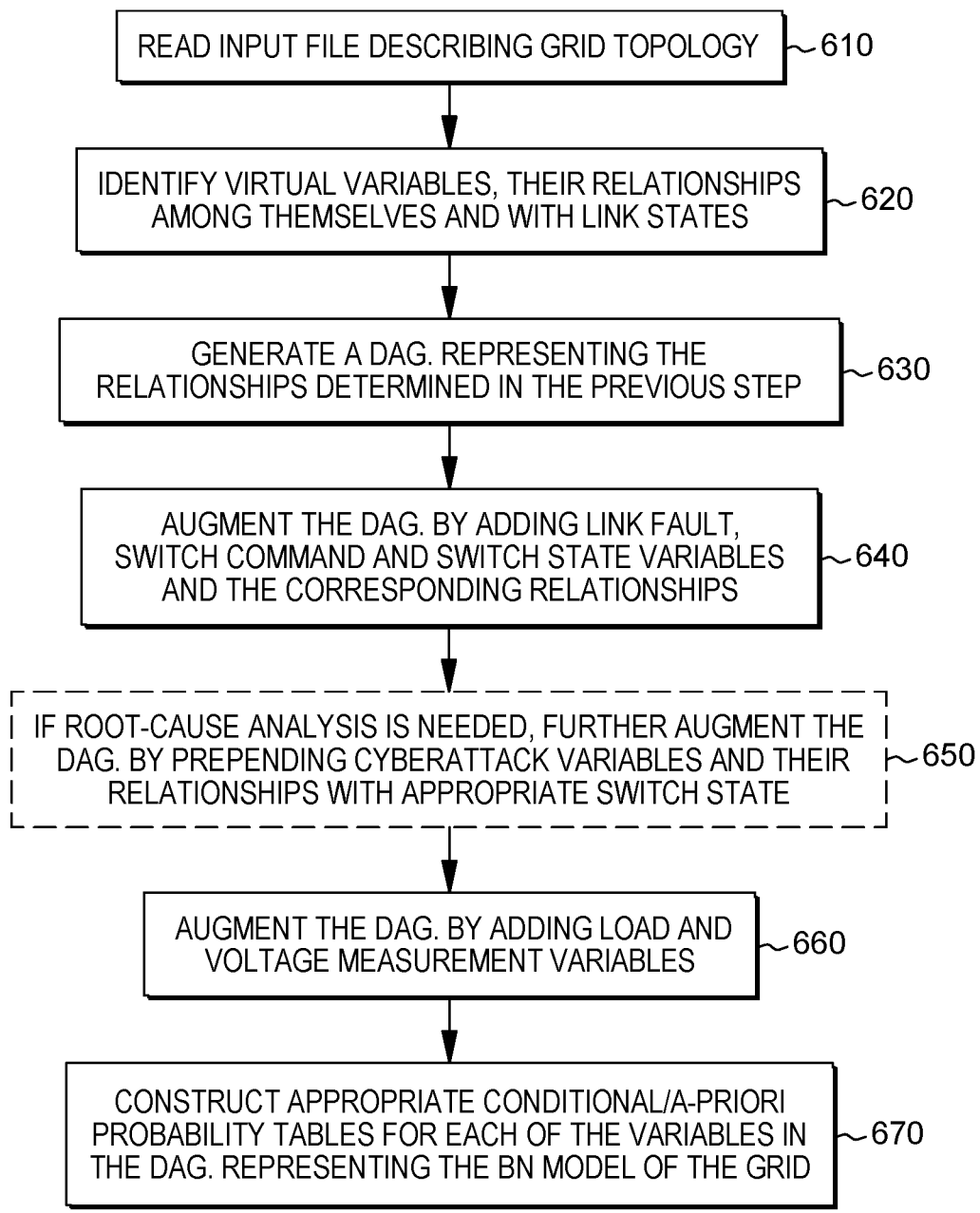
FIG. 6 is a workflow that depicts various aspects of the automatic generation of a Bayesian Network (BN) model by the program code in some embodiments of the present invention.

In embodiments of the present invention, the program code automatically generates a BN model. FIG. 6 is a workflow 600 that depicts the automatic generation of a BN model by the program code in some embodiments of the present invention. To generate the model, the program code reads (obtains), in a file (e.g., a text file) a description of grid topology, which includes not only the connections between different nodes (buses and generators), the placement of circuit breakers on the lines connecting nodes, a description of loads attached to buses, and identities of the substations where the buses are located (610). The (text) file that describes the grid topology can be generated automatically by the program code in some embodiments of the present invention. In some embodiments of the present invention, the file is auto-generated as follows: 1) the program code provides a GUI in which to produce a "1-line diagram" depicting the power grid; 2) the program code of the GUI saves the diagram as an XML file; 3) the program code processes the XML file using a 1-line diagram-to-grid topology file conversion tool to create a grid topology file (e.g., using draw.io); and 4) the program code utilizes the grid topology file to generate the BN.

Returning to FIG. 6, the program code executes a stack-based algorithm to generate the virtual variables associated with each bus voltage variable, its mutual dependencies, as well as the dependencies on the states of the links that constitute the corresponding paths (620). (The state of a link is ON, if there is no fault on that link and all the circuit breakers on that link are ON.) Using the output of the stack-based algorithm, the program code constructs a directed acyclic graph (DAG) representing the relationships between the link states, the virtual variables and the bus voltage variables (630). The program code augments the DAG by adding (prepending) link fault, switch command and switch state variables and introducing the dependencies between these variables and the appropriate link state variables (640). In BN models that include root causes analysis, the program code augments the DAG representing the BN model of the power grid by prepending various cyberattack variables and introducing the dependencies between these variables and the corresponding switch state variables (650). The program code augments the DAG by appending load variables and voltage measurement variables (660). Once the desired DAG representing the BN model of the power grid is constructed, the program code assigns conditional probability tables (CPTs) for each of the variables in the BN model (670). For those variables that do not have "parents," the program code assigns a-priori probabilities.

Figure 7B:
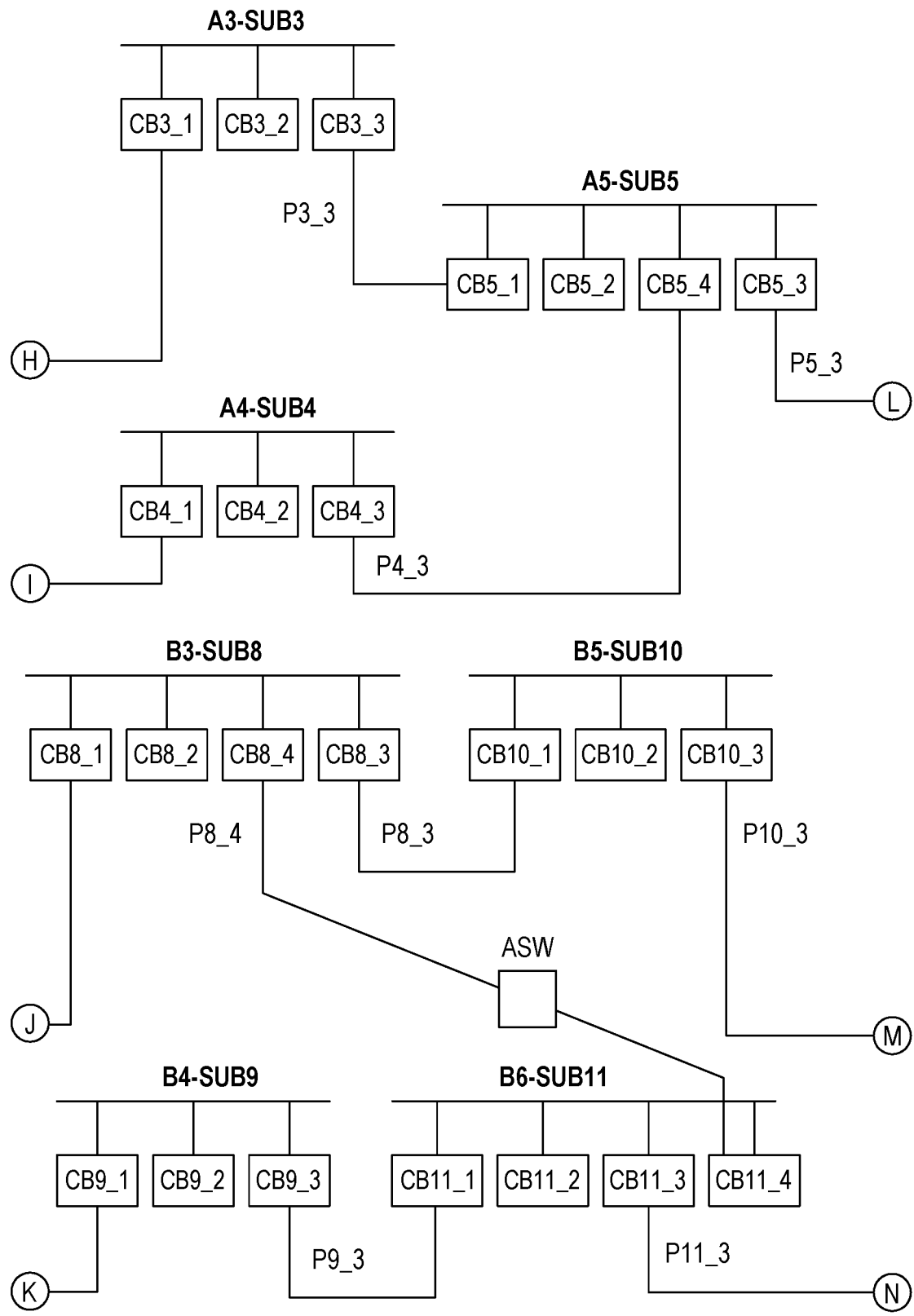
Figure 7C:
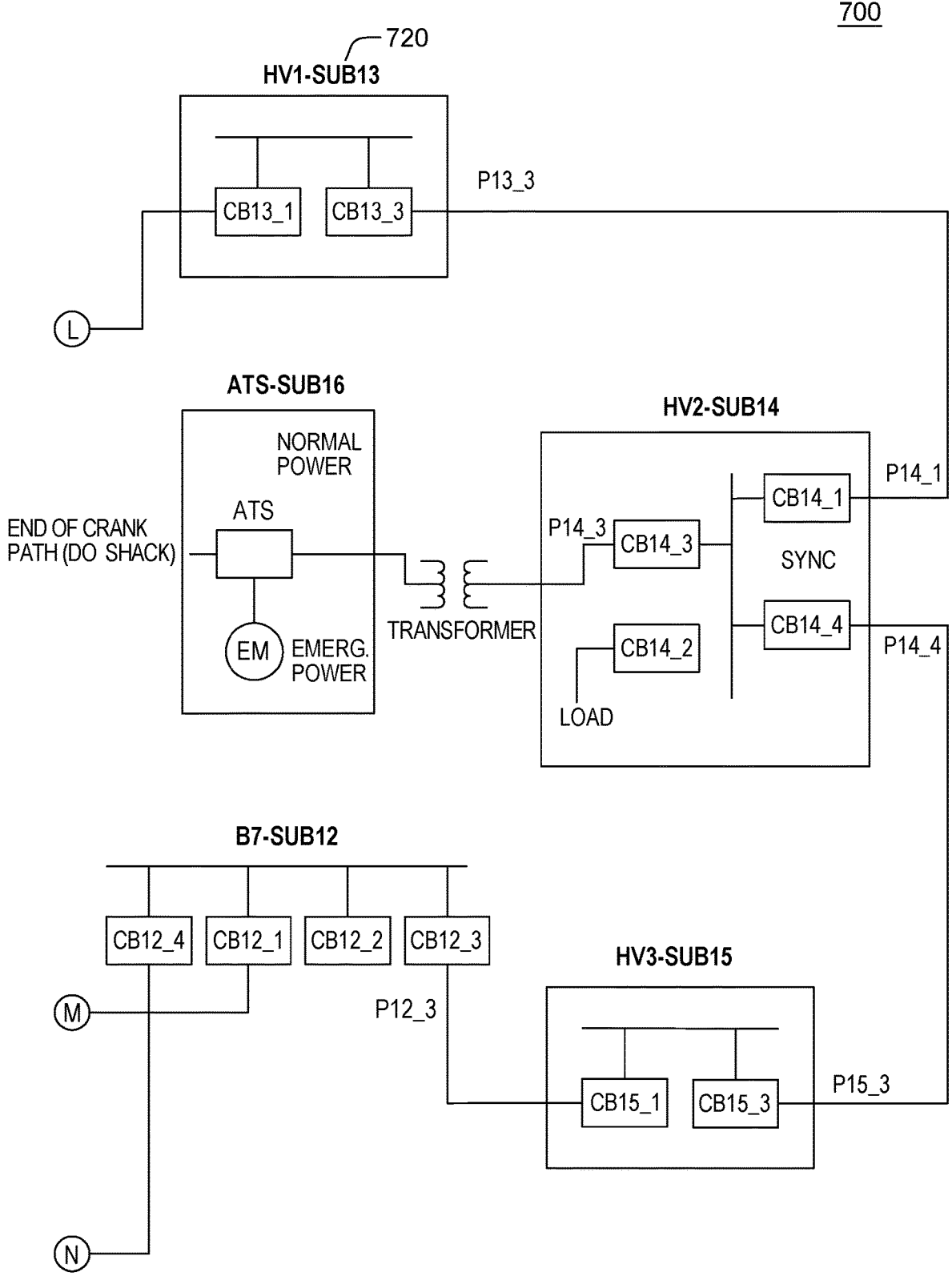

FIGS. 7A-7C (referred to collectively herein as FIG. 7) illustrate how aspects of the present invention can be utilized to model an alternative network 700 (the sensors deployed that will provide the data that is unavailable via SCADA) in the event of a black start. During a black start, a utility operator (automated or individual) is interested in the state of critical elements on the crank path such as circuit breakers, buses and lines. Specifically, the operator will want to know whether a given circuit breaker is open or closed, whether a specific bus is energized or not, whether a circuit breaker state is consistent with the command, and so on. To provide situation awareness during the black start, program code in embodiments of the present invention models these critical elements as Bayesian variables, which are mathematically described by the probabilistic structure of a BN and the corresponding joint probability distribution. FIG. 7 depicts certain critical black start attributes as Bayesian variables in the alternative network 700. These include generators (Gen), bus voltage (BV), Circuit breaker state (CB), PT measurements (P), and Loads (L). In this example, each circuit breaker has two Bayesian parents of SC (switch command to open or closed) and TEP (a terminology used to represent malware, present or absent), which are not shown in FIG. 7.

In some embodiments of the present invention, the program code generates the BN to model the causal events of the black start energization corresponding to the crank paths. As illustrated in FIG. 7, the sources or the roots of the BN are the 2 generators 710a and 710b, which energize the buses (BVs 715a and 715b) along the crank paths. Since the energization is conditioned on whether the circuit breaker along the path is open/closed, the CB and the corresponding bus voltage will jointly influence the state of the following bus voltage, which is described by a conditional probability distribution (CPD). Because the power grid electric components are bi-directional, the program code constructs separate non-cyclic branches in the BN to represent energizations that are bi-directional. As an example, the BV of substation 13 720 will be energized from both Gen1 710a of Utility A 730a and Gen2 710b of Utility B 730b. By using virtual variables the program code constructs the BN to be non-acyclic to realize bi-directional energization. The virtual variable can be understood to represent the energization of a generator and non-cyclic path between the generator and a substation node (e.g., bus voltage). As illustrated in FIG. 7, since there are in general multiple paths, there are multiple instances of virtual variables for a given substation bus. VVs are not directly observable, and the measurable voltage of a substation is then determined by a logical OR function of all the virtual variables that terminates at that substation.

Figure 8:
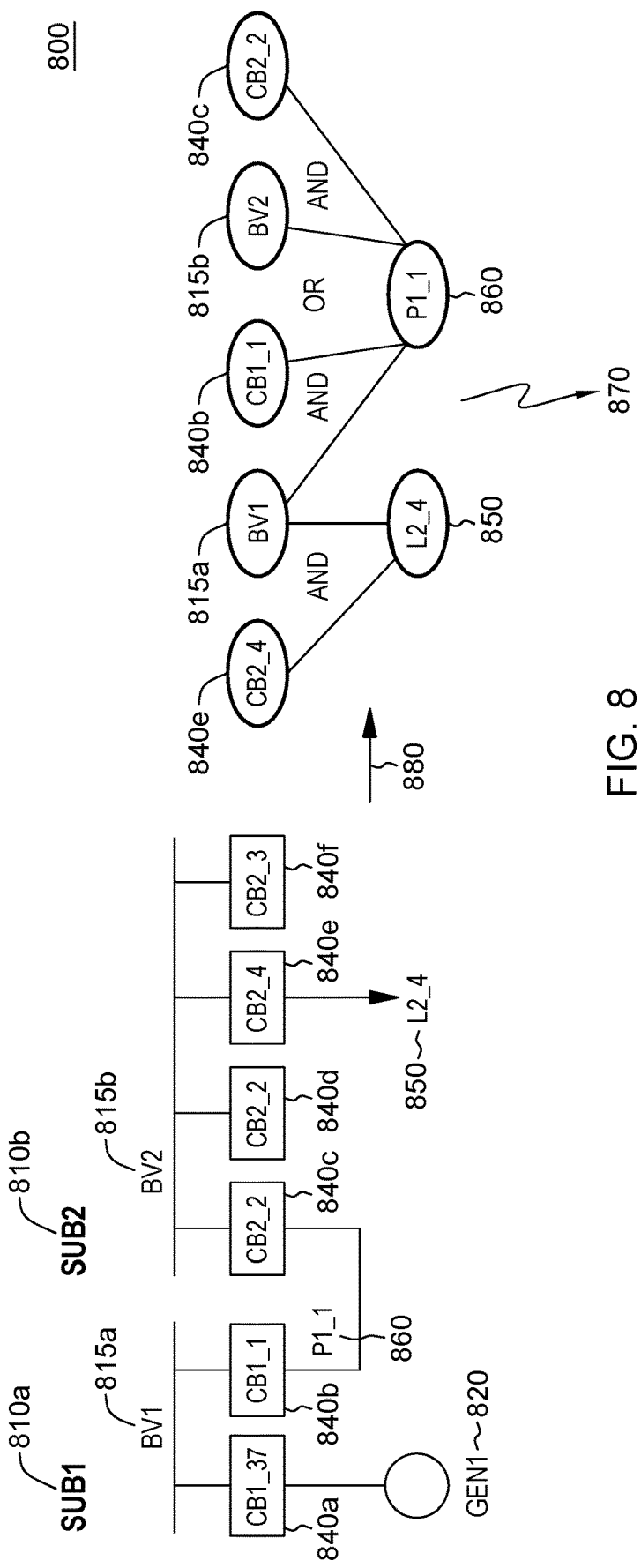
FIG. 8 illustrates how potential transformer (PT) and load can be added into the Bayesian network (BN) utilized in embodiments of the present invention.

The program code generates the BN in part by creating the BN virtual variables structure. Other BN variables including physical entities of breaker, voltage, load, and higher layer entities of switch command, TEP, other higher layer attributes can be added sequentially and incorporated into the BN. For example, FIG. 8 illustrates how bus voltages (PTs) and Circuit Breakers (CBs), and Loads (Ls) can be added into the BN utilized in embodiments of the present invention. Specifically, FIG. 8 illustrates how the BN for PT measurements, CBs, and Loads are formed by the program code 800. FIG. 8 illustrates a technical environment that includes two substations, 810a and 810b. Each substation includes a bus (BV1 and BV2) 815a and 815b. Also includes is a generator (Gen1) 820. Each substation (Sub1, Sub2)

810a and 810b includes various circuit breaker states (CB1_37, CB1_1, CB2_2, CB2_4, CB2_3) 840a-840f. A load (L2_4) 850 and a PT measurement (P1_1) 860 are also illustrated.

As illustrated in FIG. 8, since P1_1 860 can be energized either from BV1 815a or from BV2 815b, the program code combines AND-OR function as shown in the right side of FIG. 8 870. For the load 850, the program code measures by CT (Current Transformer), and the load 850 state is a logical AND function of the corresponding bus voltage and circuit breaker state.

In embodiments of the present invention, the program code collects reliable measurements from critical points on the crank path (880) and analyzes them with the BN model. The program code associates probability values with different states of an element. For example, the BN model can indicate that there is an X % probability that a certain switch is "closed" (i.e., (100−X)% probability that the switch is in an "open" state.) If it is known that the circuit breaker had been given a command (by the SCADA system) to be in the "closed" state, a (100−X)% probability of being in an "open" state would mean that there is a strong likelihood of that circuit breaker being affected by the presence of TEP. TEP is a terminology the government uses instead of the term malware. The probability values provided by the BN model can help the utility operators prioritize their remediation efforts so that those elements that are deemed more critical to the restoration of power and that appear more likely to be affected by malware are cleansed first.

Figure 9:
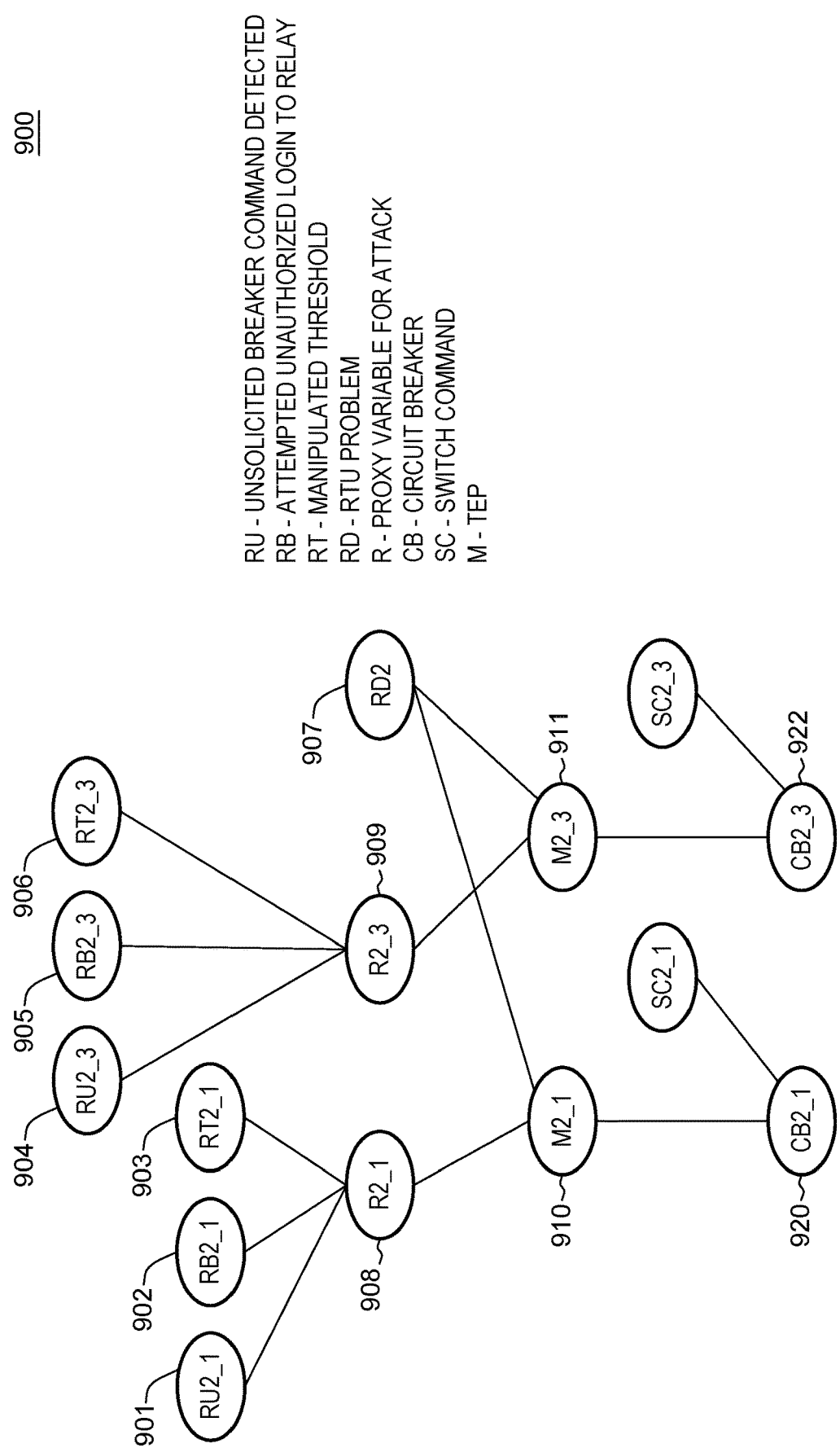
FIG. 9 is a Bayesian network (BN) generated by program code in some embodiments of the present invention.

FIG. 9 is a BN 900 generated by program code in some embodiments of the present invention that shows possible causes of breaker and command inconsistency. Some embodiments of the present invention incorporate a "root-cause" analysis into the BN model to identify the location of a cyberattack and the elements affected by it. Root causes, as identified by the BN model, can include, but are not limited to unsolicited breaker commands (RU) RU2_3 904, RU2_1 901, attempted unauthorized logins (RB), RB2_3 905, RB2_1 902 and manipulated thresholds of a Relay (RT) RT2_1 903. These possible causes influence the state of the corresponding TEP M2_1 910, M2_3 911, of the breaker via a conditional probability distribution (initially populated via expert knowledge). Also, other problems of the RTU (RD) RD2 907 can also be incorporated as influencing the TEP state. Once the program code generates the BN, any knowledge or observation for any of the BN variables allows the program code to make a probabilistic inference for any CB state, CB2_1 920, CB2_3 922, and possible root cause of potential TEP attack. Utilizing the aspects illustrated in FIG. 9, the program code can incorporate higher layer inference and model the root causes of attacks because the BN serves as a platform to integrate evidence from different levels of abstraction.

Figure 13:
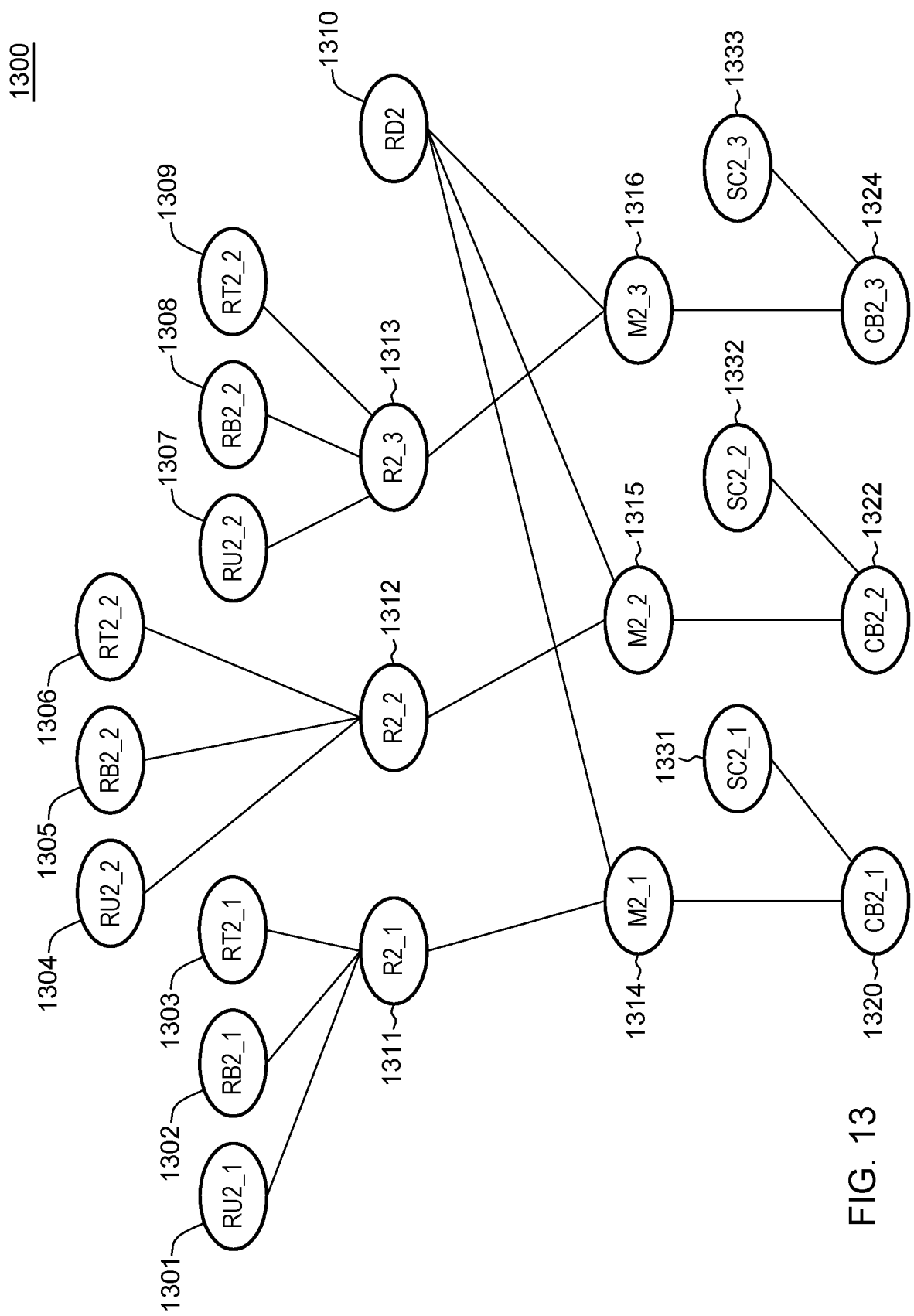
FIG. 13 is also a Bayesian Network (BN) inference generated by the program code in an embodiments of the present invention.

FIG. 13 is also a BN inference 1300 generated by the program code in an embodiments of the present invention. This BN inference 1300 is for a malware attack in three (3) circuit breakers. The variables in FIG. 13 are as follows: RU—Unsolicited breaker command detected; RB—Attempted unauthorized login to Relay; RT—Manipulated threshold; RD—RTU problem; R—Proxy variable for attacks; CB—Circuit Breaker; M—Malware; and SC—CB command. The circuit breakers CB2_1 1320, CB2_2 1322, and CB2_3 1324 obtain circuit breaker commands SC2_1 1331, SC2_2 1332, and SC2_3 1333. The malware M2_1 1314, M2_2 1315, and M2_3 1316 attacking the circuit breakers CB2_1 1320, CB2_2 1322, and CB2_3 1324 can be inferred in the BN inference 1300. The BN inference 1300 also illustrates unsolicited breaker commands, RU2_1 1301, RU2_2 1304, RU2_2 1307 in the respective circuit breakers CB2_1 1320, CB2_2 1322, and CB2_3 1324. An RTU problem RD2 1310 is also illustrated and impacts all the circuit breakers CB2_1 1320, CB2_2 1322, and CB2_3 1324. The BN inference 1300 also illustrates attempted unauthorized logins to the relay RB2_1 1302, RB2_2 1303, and RB2_2 1308, for each circuit breaker CB2_1 1320, CB2_2 1322, and CB2_3 1324. Manipulated thresholds RT2_1 1303, RT2_2 1306, RT2_2 1309 are related to proxy variables for attacks R2_1 1311, R2_2 1312, R2_3 1313.

Figure 10:
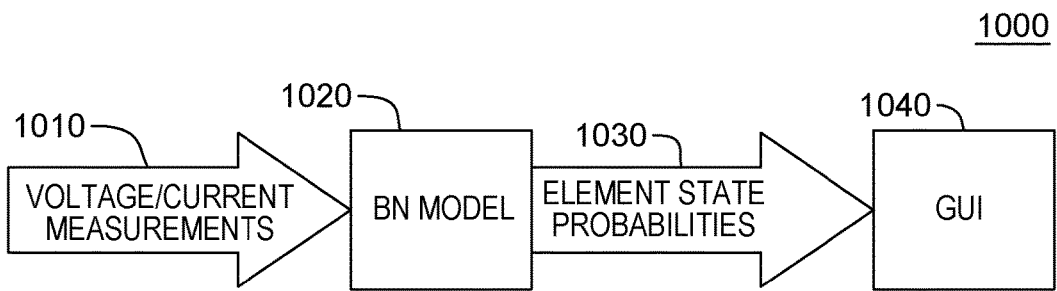
FIG. 10 is a workflow that illustrates various aspects of some embodiments of the present invention.
Figure 11:
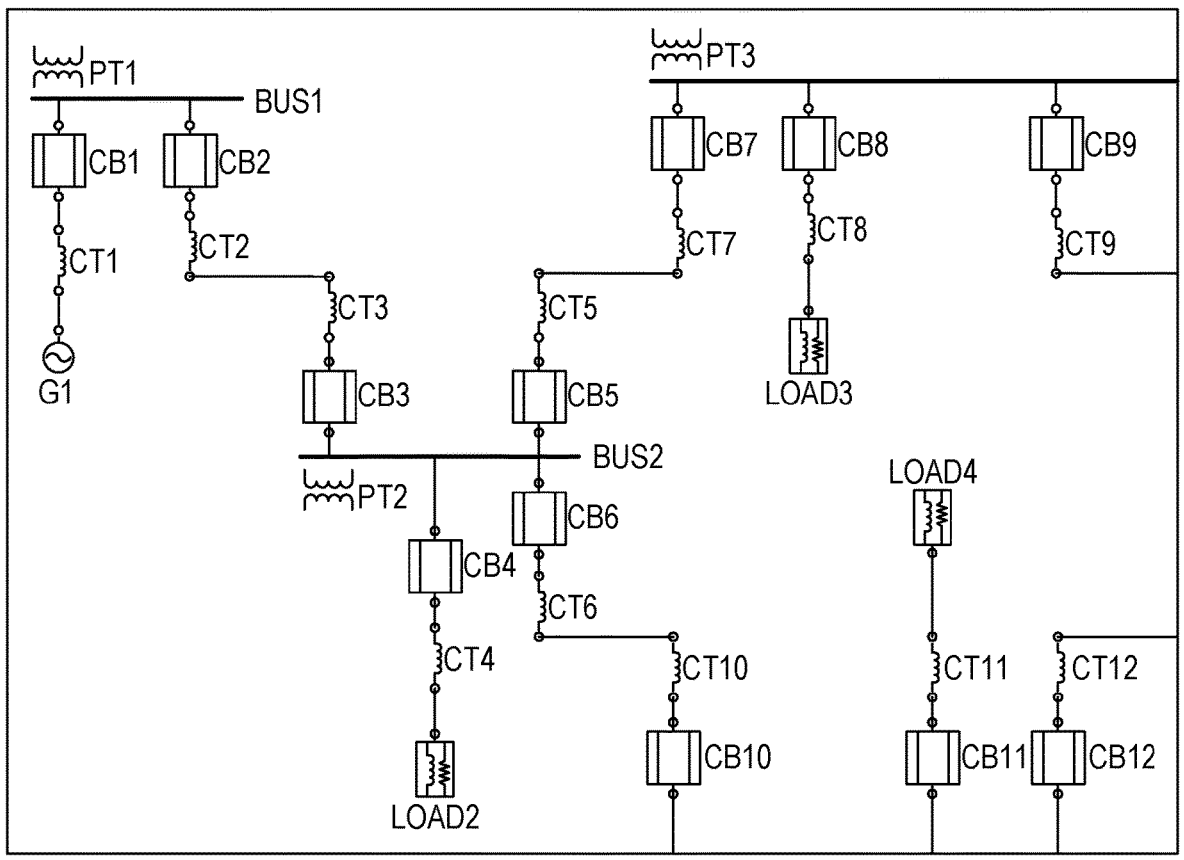
FIG. 11 is an example of a display of results in a GUI (generated by program code in some embodiments of the present invention), in some embodiments of the present invention.

Turning now to FIG. 10, as illustrated in the workflow 1000 of FIG. 10, in embodiments of the present invention, the program code obtains voltage/current measurements (1010), which is utilizes to generate a BN model 1020. The program code utilizes the generated BN model to generate elements' state probabilities (1030) and displays these results in a GUI 1040. FIG. 11 is an example of a display of results in a GUI 1100, in an embodiments of the present invention. The program code generates the display in the GUI using in some embodiments of the present invention and utilizes different colors to reflect different to provide situational awareness. For example, an energization status (red is live) as well as cyber status (blue is healthy) can be shown in the GUI. The GUI provides a drill down functionality such that other screens enable a user to drill down into individual status of breakers and components. By utilizing the GUI, a recovery team can quickly determine where to deploy resources next in order to address issues exposed in the GUI by the program code.

As discussed above, in embodiments of the present invention, program code executing on one or more processors determines a minimal number of sensors that can be deployed to locations of a grid to form the out-of-band network that will ultimately provide situational awareness when the SCADA is either unavailable or otherwise compromised. Thus, embodiments of the present invention can provide situational awareness for a power grid with scarce or missing data, and mitigate the large cost of deployment. In embodiments of the present invention, only a small subset of sensors are utilized to provide near full observation of the state of the grid. This gain is attributed to the inferencing capability of the novel Bayesian network, which removes the need for redundant sensor information in traditional sensor networks. The exact number of sensors saved depends on network topology and other factors, but in many situations, a fraction (~25%) of sensing points is sufficient to achieve ~95% equivalence of the full situation awareness.

The program code in embodiments of the present invention can determine the number and location(s) of sensors to utilize such that the program code can sufficiently determine the situational awareness, while keeping the number down for logistical reasons. Entropy is a basis for measuring degree of situation awareness and a threshold degree of situational awareness is achieved using aspects of the present invention to determine the number and placement of sensors. Generally, utility operators are interested in real-time knowledge of key entities including bus voltage, input/output current, circuit breaker state, and load status. In traditional operation, one attempts to measure all the key entities directly, if possible, and apply deductive reasoning (a specific branch of logical reasoning) to draw conclusion. While logical reasoning is a common practice, it often gives inconclusive answers when there are missing measurements or uncertainties of latent variables, except in trivial cases. As discussed above, embodiments of the present invention use BN(s) to provide probabilistic inference to hypotheses given any number of measurements. Program code in embodiments of the present invention can produce these measurements within seconds of execution time and can handle uncertainties resulted from missing data (such as bus voltage of HV substations) or malware attack (latent variable). As understood by one of skill in the art, Bayesian inference can be viewed as a superset of deductive reasoning since it also provides all the logical deduction if it exists. To illustrate the determination of the number of sensors to use in the out-of-band network, the non-limiting example of a black start situation is utilized for illustrative purposes only.

Determining the efficacy of utilizing a Bayesian inference and/or quantifying the performance when compared to deductive reasoning can be shown by estimating the number of sensor measurements needed to provide situation awareness, as sensors are expensive to implement in a black start environment (as one non-limiting example). To determine the number to utilize for an effective inference to be made in embodiments of the present invention, the situation awareness is defined as information content of desired attributes of the system, meaning the degree of uncertainty of a system. A common way of measuring uncertainty of a random variable X is by computing the entropy. Given a discrete variable X with states $x_i$, the entropy $U(X)$ is given by, Equation 1 below:

$$U(X) = \sum_{x_i} P(x_i) \log_2 \frac{1}{P(x_i)} \qquad \text{(Equation 1)}$$

In Equation 1, $P(x_i)$ is the probability of $X=x_i$. For binary variables, the entropy is maximized (=1) when $P(x_1)=P(x_2)=0.5$. Any other probabilities will have a lower entropy (for example P=0.25 gives an entropy of 0.8113).

In embodiments of the present invention, to determine the uncertainty of the state of a circuit breaker (on/off) in a black start situation, given n sensor measurements such as PTs and/or CTs (denoted as $\{s_1, s_2, \ldots s_n\}$), the program code can utilize Bayesian inference and Equation 1 to compute the entropy of the circuit breaker. For n sensors there are $2^n$ possible combination of different sensor states. The k-th sensor state ($S_k$) corresponds to an entropy of circuit breaker C of value $U(C|S_k)$. To compute the entropy of a circuit breaker C with respect to all the possible states of the sensors S, the program code averages all the entropies corresponding to all the possible states of S. Equation 2 below is utilized by the program code to obtain average entropy.

$$\overline{U}(C) = \frac{1}{2^n} \sum_{\{S_k : k=1,\ldots,2^n\}} U(C|S_k) \qquad \text{(Equation 2)}$$

In Equation 2 ($\overline{U}$) is the average entropy. Situation awareness can be defined as $S_A = 1 - \overline{U}(C)$. Thus situation awareness would generally be an increasing function of the number of sensors. The program code determines the relationship between the number of sensor measurements (n) and the corresponding level of situation awareness. The exact value of $S_A$ would depend on the choice of the specific set of sensors. FIG. 15 depicts number of sensor results in various situations, i.e., the results illustrating degree of situational awareness (y-axis) and number of PT sensors (x-axis).

In some embodiments of the present invention, the threshold is $S_A = 0.72$ (U=0.28), which corresponds to the circuit breaker being close/open with a probability of 0.95. Note that while more sensors are needed to achieve certain threshold of situation awareness, the percentage of minimum sensors needed is small for larger networks, indicating that most of the information content is contained in the first 20% of the sensors when they are randomly located. The number of sensors utilized to enable inferences in accordance with aspects of the present invention can vary depending on the complexity for a network. For example, the percentage of nodes monitored in a linear network would be smaller than the percentage monitored in a mesh (or other more complex structurally) network.

The program code compares the number of sensors needed between the entropy-based situation awareness and a direct measurement scheme. In the direct measurement case, establishing a baseline is not easy due to the large amount of different deductive reasoning schemes involved. Thus, the program code can apply a simple and intuitive scheme for the baseline. In determining the number of sensors to utilize, the program code can assume that for every substation there is a bus voltage measurement, a current measurement at the output of the substation relay(s) and the generators. In the non-limiting example of a black start network, this amounts to 16 PTs and 18 CTs for a total of 34 measurements. These should give full visibility into the state of the circuit breakers. If one compares the 8 sensor measurements needed for Bayesian inference to the 34 measurements in the baseline case, a significant savings of ~76% is realized.

Embodiments of the present invention provide a computer-implemented method, computer program product, and system for measuring situation awareness and when comparing the number of sensors needed for Bayesian inference vs direct measurements, the result of these embodiments show significant saving in the number of sensors for the Bayesian approach disclosed herein.

Figure 12:
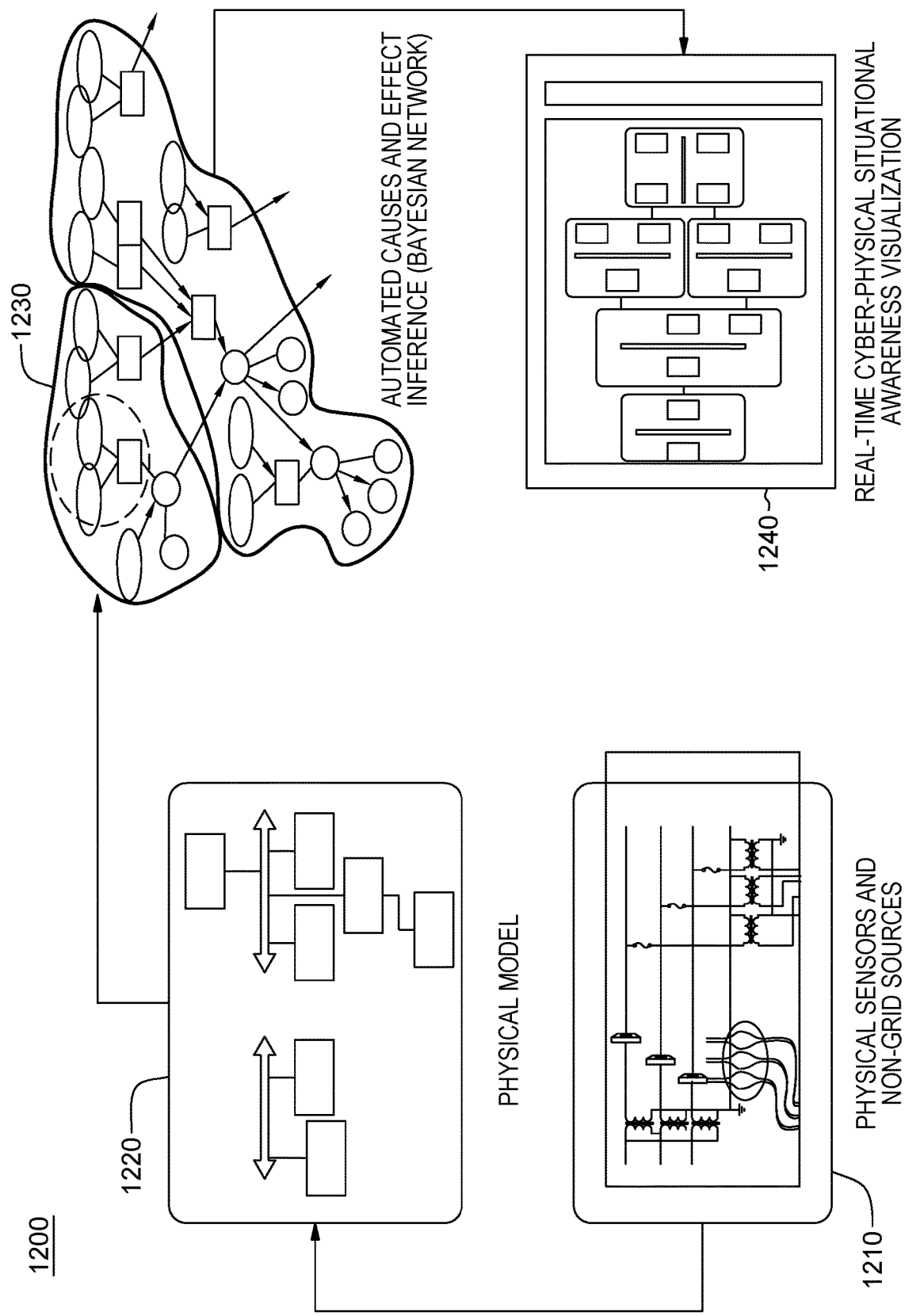
FIG. 12 is a workflow that illustrates certain aspects of some embodiments of the present invention.

In embodiments of the present invention, the inference engine (BN) models multiple abstraction layers of sensing and correlates sensing location with the topology of the grid network. Multiple abstraction levels includes power outages detected at the social media level (e.g., through Twitter messages), communication failure of the telemetry and control network (SCADA and RTUs), as well manual operation mode (e.g., a circuit breaker is manually closed). Accordingly, risk can be properly assessed at different abstraction levels to provide a comprehensive view of situation awareness. This is in contrast with current EMS monitoring in which multiple abstraction layers (physical failures, communication failures, and cyber-attack) are handled separately. FIG. 12 provides a high level illustration of many aspects described herein. In addition, FIG. 9 illustrates inferencing applied to different levels of abstraction. As FIG. 9 is discussed above, referring to FIG. 12, the flowchart 1200 of FIG. 12 is similar to that of FIG. 10, but provides additional illustration. As illustrated in FIG. 12, in some embodiments of the present invention, program code obtains data about a network (grid) from physical sensors and on-grid sources (e.g., FIG. 1, 105a-105n) (1210). Based on the data, the program code generates a physical model of the network (1220). Based on the physical model of the network, the program code automatically generates a cause and effect inference model (BN) (1230). The program code utilizes the BN to provide real-time cyber-physical awareness visualization through a GUI (1240).

Figure 16A:
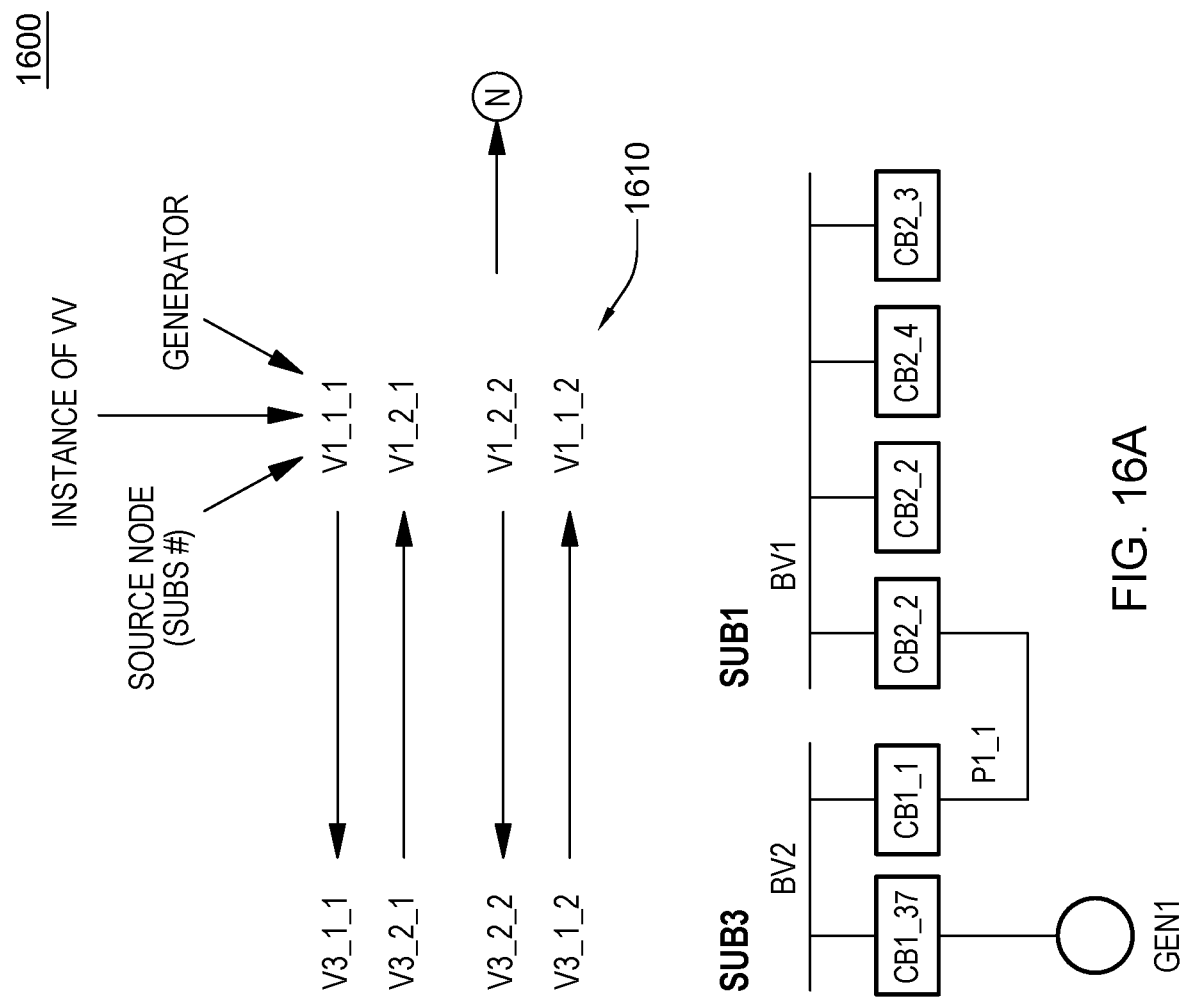
FIGS. 16A-16B (referred to collectively herein as FIG. 16) depict the generation of a Bayesian Network (BN) in accordance with some embodiments of the present invention.
Figure 16B:
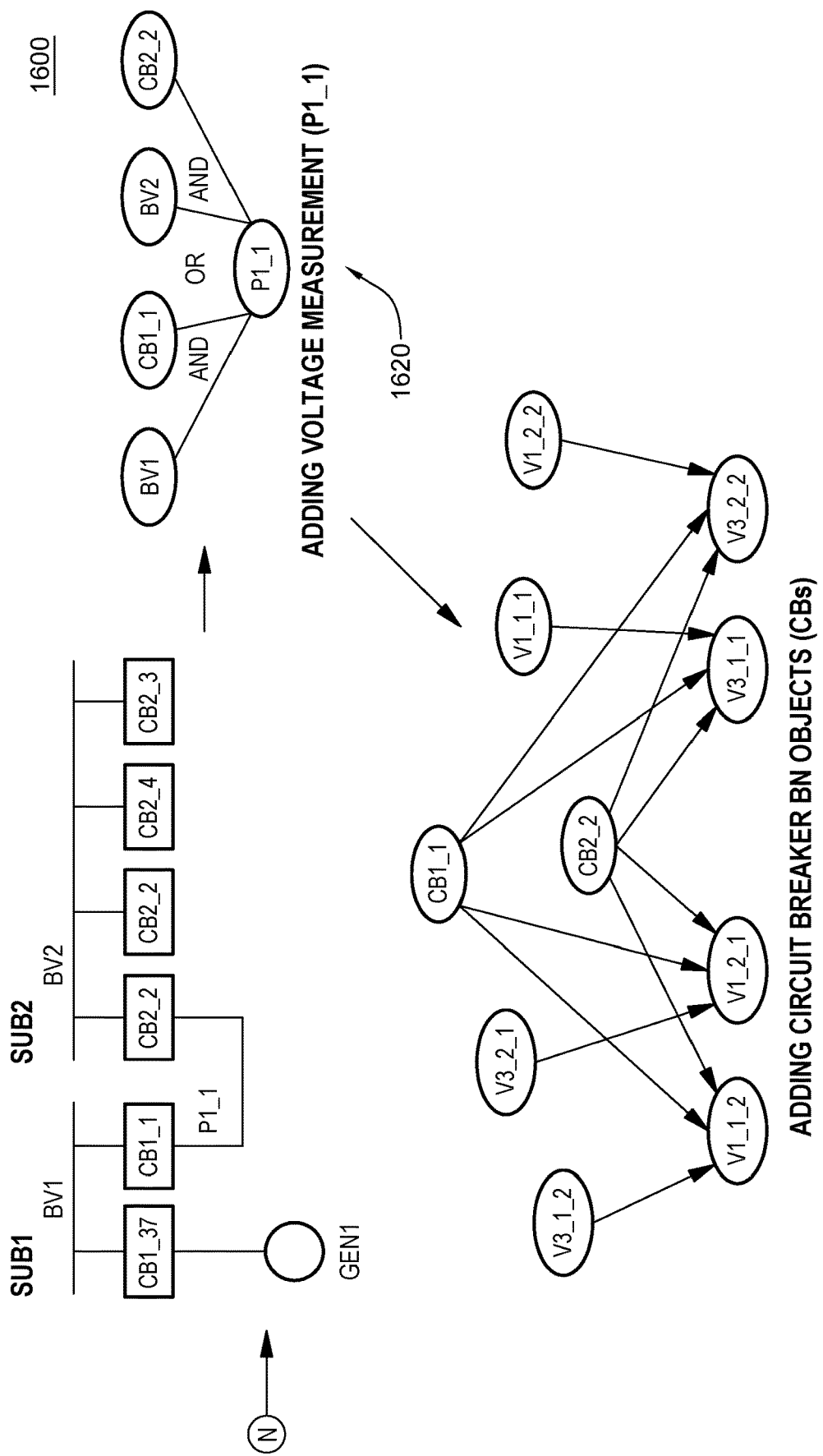

Referring to FIGS. 16A-16B (referred to collectively herein as FIG. 16), the generation of a BN in accordance with some embodiments of the present invention is illustrated. On the left side of FIG. 16 is the portion of a grid/network being converted (1610) into a BN by the program code in some embodiments of the present invention. FIG. 16 provides an additional illustration of various aspects of the generation of a BN 1600 in some embodiments of the present invention. Highlighted in this illustration is the program code adding voltage measurement to the BN and the program code adding circuit breaker BN objects to the BN. Referring to the bottom portion of FIG. 16A, physical elements of a given grid are illustrated. The top of FIG. 16A depicts virtual variable (V3_1_2→V1_1_2 mean virtual variable V3_1_2 is the BN parent of V1_1_2). Referring to FIG. 16B, the program code combines the virtual variables with the physical BN variables (e.g., BV, CB) to form a subsection of the BN. P1_1 (PT measurement) is influenced by logical operations of BV1, CB1_1, BV2, and CB2_2) (1620), and circuit breakers influence the virtual variables (Vx_y_z, where x, y, z are 1, 2, or 3 as shown in (1630). Subsections, like that depicted in FIG. 16B, are combined together by the program code to form the larger BN, and thus guarantee that the eventual BN is loop-free.

Embodiments of the present invention include a computer-implemented method, a computer program product, and a computer system that includes program code executing on one or more processors that provides situational awareness by collecting data from alternative sensors and inferring the state of a network/grid.

Some embodiments of the present invention include a system comprising a network comprising multiple nodes, where the network is a mesh network comprising multiple intertwining loops, one or more sensors deployed on a pre-determined portion of the multiple nodes, where the pre-determined portion comprises a number of nodes comprising a specific fraction of the multiple nodes, one or more communication devices communicatively coupled to the one or more sensors to obtain measurements from the one or more sensors, a memory, one or more processors communicatively coupled to the one or more sensors and in communication with the memory, and program instructions executable by the one or more processors, via the memory, to perform a method. The method includes program code executed by the one or more processors obtaining a configuration of the network, where the configuration of the network comprises configurations of the multiple nodes and configurations of the communication devices. Based on obtaining the configuration, the program code automatically models the network to generate a system model. The program code derives, from the system model, a loop-free Bayesian inference model, where deriving the loop-free Bayesian inference model comprises generating a loop-free Bayesian network from the network.

Some embodiments of the present invention include a computer-implemented method where program code executing on one or more processors obtains a configuration of a network, where the network is a mesh network comprising multiple intertwining loops. The network comprises: multiple nodes, one or more sensors on a pre-determined portion of the multiple nodes, where the pre-determined portion comprises a number of nodes comprising a specific fraction of the multiple nodes, and one or more communication devices communicatively coupled to the one or more sensors to obtain measurements from the one or more sensors, where the configuration of the network comprises configurations of the multiple nodes and configurations of the communication devices. Based on obtaining the configuration, the program code automatically models the network to generate a system model. The program code derives, from the system model, a loop-free Bayesian inference model, where deriving the loop-free Bayesian inference model comprises generating a loop-free Bayesian network from the network.

Some embodiments of the present invention include a computer program product that includes a computer readable storage medium readable by one or more processors and storing instructions for execution by the one or more processors for performing a method. The method includes program code executed by the one or more processors obtaining a configuration of a network, where the network is a mesh network comprising multiple intertwining loops, and where the network comprises: multiple nodes, one or more sensors on a pre-determined portion of the multiple nodes, where the pre-determined portion comprises a number of nodes comprising a specific fraction of the multiple nodes, and one or more communication devices communicatively coupled to the one or more sensors to obtain measurements from the one or more sensors, wherein the configuration of the network comprises configurations of the multiple nodes and configurations of the communication devices. Based on obtaining the configuration, the program code automatically models the network to generate a system model. The program code derives, from the system model, a loop-free Bayesian inference model, where deriving the loop-free Bayesian inference model comprises generating a loop-free Bayesian network from the network.

In some embodiments of the present invention, the program code obtains an indication of an event in the network. Based on obtaining the indication, the program code obtains the measurements, from the one or more communications devices. The program code applies the loop-free Bayesian inference model to the measurements to obtain situational awareness for the specific fraction of the multiple nodes and to derive, based on inference, situational awareness for a remainder of the multiple nodes. The program code utilizes the situational awareness for the specific fraction of the multiple nodes and the situational awareness for the remainder of the multiple nodes, to locate the event.

In some embodiments of the present invention, the program code displays, in an interface communicatively coupled to the one or more processors, a status of the system model, wherein the status comprises a visualization of the situational awareness for the specific fraction of the multiple nodes and the situational awareness for the remainder of the multiple nodes.

In some embodiments of the present invention, the network comprises a power grid and the power grid comprises a supervisory control and data acquisition system.

In some embodiments of the present invention, the measurements comprise voltage and current.

In some embodiments of the present invention, the program code, the event is selected from the group consisting of: a fault, malware, and a cyberattack.

In some embodiments of the present invention, the program code isolates the event.

In some embodiments of the present invention, the program code deriving the loop-free Bayesian inference model from the system model comprises: the program code analyzing topology of the network, to implement acyclic paths and generate a maximal path tree. The program code determines directionality of the acyclic paths, based implementing the acyclic paths. The program code excites, in the maximal path tree, virtual variables, based on the directionality of the acyclic paths. The program code generates, from the maximal path tree with the virtual variables, a Bayesian directed acyclic graph. The program code utilizes the Bayesian directed acyclic graph to generate the loop-free Bayesian inference model.

In some embodiments of the present invention, the program code analyzing the topology of the network comprises: the program code analyzing, based on graph theory, the network, where the analyzing comprises analyzing one or more multiple crank paths of the network in a black start scenario to decompose potential loops into the acyclic paths.

In some embodiments of the present invention, the configuration of the network comprises a 1-line topology and deriving the loop-free Bayesian inference model from the system model comprises automatically generating a Bayesian Network from the 1-line topology without manual intervention.

In some embodiments of the present invention, the one or more sensors is a minimal number of sensors in common grid network topologies to provide situational awareness when the supervisory control and data acquisition (SCADA) system is inaccessible by the one or more processors.

In some embodiments of the present invention, the minimal number of sensors is a number that is less than twenty-five (25) percent of a number of the multiple nodes.

In some embodiments of the present invention, the program code obtaining the configuration of the network further comprises: the program code obtaining a description of a topology of the network, where the network comprises one or more substations, where various nodes of the multiple nodes comprise buses or generators, and where the description details are selected from the group consisting of: connections between the various nodes, placement of circuit breakers on lines connecting the various nodes, a description of loads attached to nodes of the various nodes comprising the buses, and identities of the one or more substations where the buses are located.

In some embodiments of the present invention, the network comprises a power grid, the power grid further comprises a source, the power grid further comprises one or more additional grid elements selected from the group consisting of: a bus voltage, a circuit breaker, a load, malware, relay status, and an out-of-band communication element, and where exciting in the maximal path tree, virtual variables, based on implementing the acyclic paths comprises: the program code executing a graph-theoretical algorithm to generate the virtual variables as output, where each virtual variable is obtained from the maximal path tree and is associated with a power flow direction from the source, where the virtual variables comprise a structure of the acyclic path corresponding to the loop-free Bayesian network. The program code adds the one or more additional grid elements to the loop-free Bayesian network.

In some embodiments of the present invention, the program code generating the Bayesian directed acyclic graph comprises: the program code constructing, from the output of the graph-theoretical algorithm, the Bayesian directed acyclic graph. The program code augments the Bayesian directed acyclic graph by adding variables and introducing dependencies between the added variables, where each added variable is selected from the group consisting of: a link fault, a switch command, and a switch state, and wherein the introduced dependencies comprise dependencies between the added variables and link state variables of one or more nodes of the multiple nodes. The program code prepends, to the Bayesian directed acyclic graph, cyberattack variables, where the prepending comprises introducing dependencies between the cyberattack variables and the added variables comprising switch states. The program code augments the Bayesian directed acyclic graph by appending load variables and voltage measurement variables from the multiple nodes.

In some embodiments of the present invention, the program code assigns a conditional probability table for each virtual variables, where the assigning comprises the program code assigning an a-priori probability to each virtual variable without a parent in the Bayesian directed acyclic graph.

In some embodiments of the present invention, where the measurements comprise voltage and current.

In some embodiments of the present invention, the event is selected from the group consisting of: a fault, a cyberattack.

Figure 17:
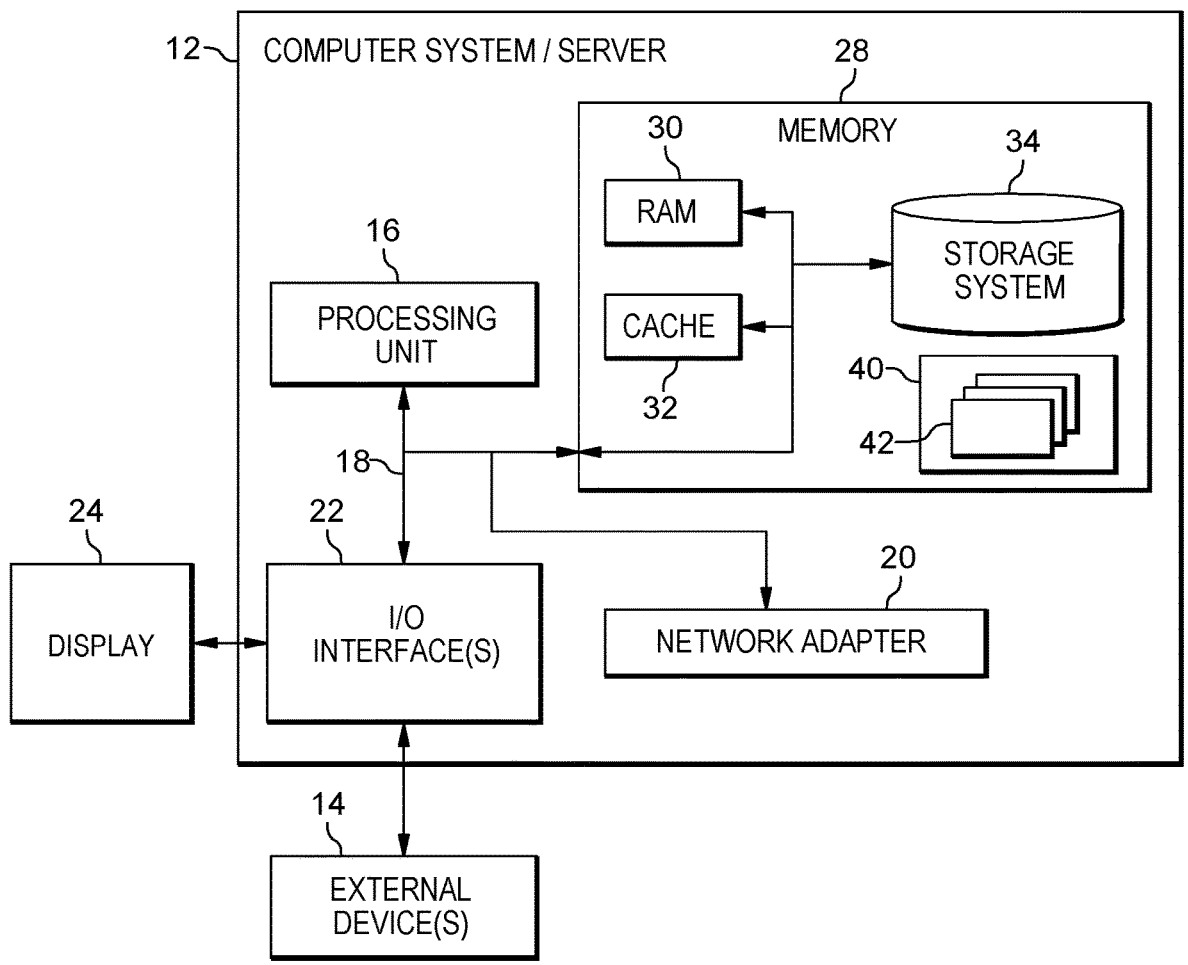
FIG. 17 depicts one embodiment of a computing node that can be utilized in a cloud computing environment.

Referring now to FIG. 17, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more processors that execute the program code can each comprise a cloud computing node 10 (FIG. 17) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A system comprising:
   a network comprising multiple nodes, wherein the network is a mesh network comprising multiple intertwining loops, wherein the network comprises a supervisory control and data acquisition (SCADA) system;
   one or more sensors deployed on a pre-determined portion of the multiple nodes, wherein the pre-determined portion comprises a number of nodes comprising a specific fraction of the multiple nodes, wherein the one or more sensors is a minimum number of sensors in common grid network topologies able to provide situational awareness when the supervisory control and data acquisition (SCADA) system is inaccessible by the one or more processors;
   one or more communication devices communicatively coupled to the one or more sensors to obtain measurements from the one or more sensors;
   a memory;
   one or more processors communicatively coupled to the one or more sensors and in communication with the memory; and
   program instructions executable by the one or more processors, via the memory, to perform a method, the method comprising:
      obtaining, by the one or more processors, a configuration of the network, wherein the configuration of the network comprises configurations of the multiple nodes and configurations of the communication devices;
      based on obtaining the configuration, automatically modeling, by the one or more processors, the network to generate a system model;
      deriving, by the one or more processors, from the system model, a loop-free Bayesian inference model, wherein deriving the loop-free Bayesian inference model comprises generating a loop-free Bayesian network from the network, wherein the loop-free Bayesian network has a one-to-one correspondence with physical elements of the network;
      obtaining, by the one or more processors, an indication of an event in the network;
      determining, by the one or more processors, that the supervisory control and data acquisition (SCADA) system is inaccessible by the one or more processors
      based on obtaining the indication and determining that the supervisory control and data acquisition (SCADA) system is inaccessible, obtaining, by the one or more processors, the measurements, from the one or more communications devices;
      applying, by the one or more processors, the loop-free Bayesian inference model, to the measurements to obtain situational awareness for the specific fraction of the multiple nodes and to derive, based on inference, situational awareness for a remainder of the multiple nodes; and utilizing, by the one or more processors, the situational awareness for the specific fraction of the multiple nodes, the situational awareness for the remainder of the multiple nodes, and the one-to-one correspondence, to locate the event.

2. The system of claim 1, the method further comprising:
displaying, by the one or more processors, in an interface communicatively coupled to the one or more processors, a status of the system model, wherein the status comprises a visualization of the situational awareness for the specific fraction of the multiple nodes and the situational awareness for the remainder of the multiple nodes.

3. The system of claim 1, wherein the network comprises a power grid.

4. The system of claim 1, wherein the measurements comprise voltage and current.

5. The system of claim 1, wherein the event is selected from the group consisting of: a fault, malware, and a cyberattack.

6. The system of claim 1, the method further comprising:
isolating, by the one or more processors, the event.

7. The system of claim 1, wherein deriving the loop-free Bayesian inference model from the system model comprises:
analyzing, by the one or more processors, topology of the network, to implement acyclic paths and generate a maximal path tree;
determining, by the one or more processing, directionality of the acyclic paths, based implementing the acyclic paths;
exciting, by the one or more processors, in the maximal path tree, virtual variables, based on the directionality of the acyclic paths;
generating, by the one or more processors, from the maximal path tree with the virtual variables, a Bayesian directed acyclic graph; and
utilizing, by the one or more processors, the Bayesian directed acyclic graph, to generate the loop-free Bayesian inference model.

8. The system of claim 7, wherein analyzing the topology of the network comprises:
analyzing, by the one or more processors, based on graph theory, the network, wherein the analyzing comprises analyzing one or more multiple crank paths of the network in a black start scenario to decompose potential loops into the acyclic paths.

9. The system of claim 7, wherein the configuration of the network comprises a 1-line topology, and wherein deriving the loop-free Bayesian inference model from the system model comprises automatically generating a Bayesian Network from the 1-line topology without manual intervention.

10. The system of claim 1, wherein the minimal number of sensors is a number that is less than twenty-five (25) percent of a number of the multiple nodes.

11. The system of claim 1, wherein obtaining the configuration of the network further comprises:
obtaining, by the one or more processors, a description of a topology of the network, wherein the network comprises one or more substations, wherein various nodes of the multiple nodes comprise buses or generators, and wherein the description details are selected from the group consisting of: connections between the various nodes, placement of circuit breakers on lines connecting the various nodes, a description of loads attached to nodes of the various nodes comprising the buses, and identities of the one or more substations where the buses are located.

12. The system of claim 7, wherein the network comprises a power grid, the power grid further comprising a source, the power grid further comprising one or more additional grid elements selected from the group consisting of: a bus voltage, a circuit breaker, a load, malware, relay status, and an out-of-band communication element, and wherein exciting in the maximal path tree, virtual variables, based on implementing the acyclic paths comprises:
executing, by the one or more processors, a graph-theoretical algorithm to generate the virtual variables as output, wherein each virtual variable is obtained from the maximal path tree and is associated with a power flow direction from the source, wherein the virtual variables comprise a structure of the acyclic path corresponding to the loop-free Bayesian network; and
adding, by the one or more processors, the one or more additional grid elements to the loop-free Bayesian network.

13. The system of claim 12, wherein generating the Bayesian directed acyclic graph comprises:
constructing, by the one or more processors, from the output of the graph-theoretical algorithm, the Bayesian directed acyclic graph;
augmenting, by the one or more processors, the Bayesian directed acyclic graph by adding variables and introducing dependencies between the added variables, wherein each added variable is selected from the group consisting of: a link fault, a switch command, and a switch state, and wherein the introduced dependencies comprise dependencies between the added variables and link state variables of one or more nodes of the multiple nodes;
prepending, by the one or more processors, to the Bayesian directed acyclic graph cyberattack variables, wherein the prepending comprises introducing dependencies between the cyberattack variables and the added variables comprising switch states; and
augmenting, by the one or more processors, the Bayesian directed acyclic graph by appending load variables and voltage measurement variables from the multiple nodes.

14. The system of claim 12, further comprising:
assigning, by the one or more processors, a conditional probability table for each virtual variables, wherein the assigning comprises assigning an a-priori probability to each virtual variable without a parent in the Bayesian directed acyclic graph.

15. A computer-implemented method comprising:
obtaining, by one or more processors, a configuration of a network, wherein the network is a mesh network comprising multiple intertwining loops and a supervisory control and data acquisition (SCADA) system, and wherein the network further comprises:
multiple nodes;
one or more sensors on a pre-determined portion of the multiple nodes, wherein the pre-determined portion comprises a number of nodes comprising a specific fraction of the multiple nodes, wherein the one or more sensors is a minimum number of sensors in common grid network topologies able to provide situational awareness when the supervisory control and data acquisition (SCADA) system is inaccessible by the one or more processors; and one or more communication devices communicatively coupled to the one or more sensors to obtain measurements from the one or more sensors, wherein the configuration of the network comprises configurations of the multiple nodes and configurations of the communication devices;

based on obtaining the configuration, automatically modeling, by the one or more processors, the network to generate a system model; and deriving, by the one or more processors, from the system model, a loop-free Bayesian inference model, wherein deriving the loop-free Bayesian inference model comprises generating a loop-free Bayesian network from the network;

obtaining, by the one or more processors, an indication of an event in the network;

determining, by the one or more processors, that the supervisory control and data acquisition (SCADA) system is inaccessible by the one or more processors;

based on obtaining the indication and determining that the supervisory control and data acquisition (SCADA) system is inaccessible, obtaining, by the one or more processors, the measurements, from the one or more communications devices;

applying, by the one or more processors, the loop-free Bayesian inference model, to the measurements to obtain situational awareness for the specific fraction of the multiple nodes and to derive, based on inference, situational awareness for a remainder of the multiple nodes; and utilizing, by the one or more processors, the situational awareness for the specific fraction of the multiple nodes, the situational awareness for the remainder of the multiple nodes, and the one-to-one correspondence, to locate the event.

16. A computer program product comprising:

a computer readable storage medium readable by one or more processors and storing instructions for execution by the one or more processors for performing a method comprising:

obtaining, by the one or more processors, a configuration of a network, wherein the network is a mesh network comprising multiple intertwining loops, and wherein the network comprises:

multiple nodes;

one or more sensors on a pre-determined portion of the multiple nodes, wherein the pre-determined portion comprises a number of nodes comprising a specific fraction of the multiple nodes; and one or more communication devices communicatively coupled to the one or more sensors to obtain measurements from the one or more sensors, wherein the configuration of the network comprises configurations of the multiple nodes and configurations of the communication devices;

based on obtaining the configuration, automatically modeling, by the one or more processors, the network to generate a system model; and deriving, by the one or more processors, from the system model, a loop-free Bayesian inference model, wherein deriving the loop-free Bayesian inference model comprises generating a loop-free Bayesian network from the network;

obtaining, by the one or more processors, an indication of an event in the network;

determining, by the one or more processors, that the supervisory control and data acquisition (SCADA) system is inaccessible by the one or more processors;

based on obtaining the indication and determining that the supervisory control and data acquisition (SCADA) system is inaccessible, obtaining, by the one or more processors, the measurements, from the one or more communications devices;

applying, by the one or more processors, the loop-free Bayesian inference model, to the measurements to obtain situational awareness for the specific fraction of the multiple nodes and to derive, based on inference, situational awareness for a remainder of the multiple nodes; and utilizing, by the one or more processors, the situational awareness for the specific fraction of the multiple nodes, the situational awareness for the remainder of the multiple nodes, and the one-to-one correspondence, to locate the event.

\* \* \* \* \*